United States Patent
Um et al.

(10) Patent No.: US 10,932,294 B2
(45) Date of Patent: Feb. 23, 2021

(54) METHOD FOR TRANSMITTING UPLINK DATA CONSIDERING HIDDEN NODE PROBLEM AND CHANNEL OCCUPATION OF USER TERMINALS

(71) Applicant: ELECTRONICS AND TELECOMMUNICATIONS RESEARCH INSTITUTE, Daejeon (KR)

(72) Inventors: Jung Sun Um, Daejeon (KR); Sung Jin Yoo, Daejeon (KR); Hoi Yoon Jung, Daejeon (KR); Seung Keun Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 50 days.

(21) Appl. No.: 15/565,141

(22) PCT Filed: Mar. 15, 2016

(86) PCT No.: PCT/KR2016/002593
§ 371 (c)(1),
(2) Date: Oct. 6, 2017

(87) PCT Pub. No.: WO2016/163657
PCT Pub. Date: Oct. 13, 2016

(65) Prior Publication Data
US 2018/0092128 A1    Mar. 29, 2018

(30) Foreign Application Priority Data

Apr. 9, 2015  (KR) .................. 10-2015-0050409
Mar. 14, 2016 (KR) .................. 10-2016-0030073

(51) Int. Cl.
*H04W 74/08* (2009.01)
*H04W 74/00* (2009.01)
(Continued)

(52) U.S. Cl.
CPC ....... *H04W 74/0825* (2013.01); *H04W 16/14* (2013.01); *H04W 72/0406* (2013.01);
(Continued)

(58) Field of Classification Search
CPC ......... H04W 74/0825; H04W 74/0808; H04W 72/0406; H04W 74/006; H04W 16/14;
(Continued)

(56) References Cited

U.S. PATENT DOCUMENTS 7,206,319 B2    4/2007  Li et al.
2010/0316096 A1* 12/2010 Adjakple .............. H04L 1/1887
                                                     375/211
(Continued)

FOREIGN PATENT DOCUMENTS

KR   10-2014-0073534 A    6/2014
KR   10-2014-0125408 A   10/2014
(Continued)

OTHER PUBLICATIONS

Ng, "Methods and apparatus for uplink channel access and transmissions for LTE on unlicensed", U.S. Appl. No. 62/098,853, filed Dec. 31, 2014 (Year: 2014).*
(Continued)

*Primary Examiner* — Thinh D Tran
(74) *Attorney, Agent, or Firm* — Rabin & Berdo, P.C.

(57) ABSTRACT

The present invention relates to a method for transmitting uplink data in a spectrum sharing wireless communication system wherein, in order to enhance uplink transmission efficiency in an LTE-U service, clear channel assessment (CCA) is performed on a user terminal so as to consider the
(Continued)

hidden node problem, and channel occupation based on an uplink signal of another terminal is considered, wherein applied are: a method for generating and transmitting a random backoff counter value at a base station so that all terminals can equally use a channel connection parameter needed for transmitting an uplink subframe in an unlicensed band; and a downlink controlling method for scheduling an uplink multi-subframe.

13 Claims, 21 Drawing Sheets

(51) Int. Cl.
H04W 72/04 (2009.01)
H04W 16/14 (2009.01)
H04W 72/12 (2009.01)
(52) U.S. Cl.
CPC ..... H04W 74/006 (2013.01); H04W 74/0808 (2013.01); H04W 72/0446 (2013.01); H04W 72/0453 (2013.01); H04W 72/1289 (2013.01)
(58) Field of Classification Search
CPC ......... H04W 72/1289; H04W 72/0453; H04W 72/0446
See application file for complete search history.

(56) References Cited

U.S. PATENT DOCUMENTS

| | | |
|---|---|---|
| 2013/0148635 A1 | 6/2013 | Park et al. |
| 2013/0183971 A1* | 7/2013 | Tamaki ............. H04W 36/0061 455/436 |
| 2013/0208587 A1 | 8/2013 | Bala et al. |
| 2014/0036889 A1* | 2/2014 | Kim .................... H04L 1/1854 370/336 |
| 2014/0086112 A1* | 3/2014 | Stern-Berkowitz ......................... H04W 72/1289 370/280 |
| 2014/0301359 A1 | 10/2014 | Seo et al. |
| 2015/0055541 A1 | 2/2015 | Zhang et al. |
| 2015/0071060 A1 | 3/2015 | Bhushan et al. |
| 2015/0124771 A1 | 5/2015 | Ko et al. |
| 2015/0180622 A1* | 6/2015 | Yoo .................... H04L 27/2602 370/330 |
| 2015/0223075 A1* | 8/2015 | Bashar ................ H04W 16/14 370/329 |
| 2015/0365830 A1* | 12/2015 | Wei ...................... H04J 3/1694 370/280 |
| 2015/0365965 A1* | 12/2015 | Wu ....................... H04L 1/1812 370/328 |
| 2016/0165579 A1* | 6/2016 | You ..................... H04B 7/2643 370/280 |
| 2016/0183293 A1* | 6/2016 | Lei ...................... H04W 72/14 370/329 |
| 2016/0192396 A1* | 6/2016 | Ng ................... H04W 74/0808 370/329 |
| 2016/0233989 A1* | 8/2016 | Belghoul .............. H04L 1/1887 |
| 2016/0345346 A1* | 11/2016 | Kim ....................... H04L 5/001 |
| 2017/0085346 A1* | 3/2017 | Tiirola .................. H04W 28/26 |
| 2017/0094642 A1* | 3/2017 | Lee ...................... H04L 1/1887 |
| 2018/0310332 A1* | 10/2018 | Ahn ................. H04W 74/0816 |

FOREIGN PATENT DOCUMENTS

| | | |
|---|---|---|
| KR | 10-2014-0148277 A | 12/2014 |
| WO | WO-2013/096928 A1 | 6/2013 |

OTHER PUBLICATIONS

Belghould et al., "Method and Apparatus for Time Division LTE Transmission in Unlicensed Radio Frequency", U.S. Appl. No. 62/113,306, filed Feb. 6, 2015 (Year: 2015).*
Ahn et al., "Efficient Radio Channel Access Scheme based on Carrier Sensing", the U.S. Appl. No. 62/096,535, filed Dec. 23, 2014 (Year: 2014).*
Ahn et al., "Efficient Radio Channel Access Scheme based on Carrier Sensing", the U.S. Appl. No. 62/074,659, filed Nov. 4, 2014 (Year: 2014).*
LG Electronics, "Consideration on LTE operation in unlicensed spectrum", RWS-140031, Workshop for LTE Unlicensed band, presentation slide, Jun. 19, 2014, Sophia Antipolis, France.

* cited by examiner

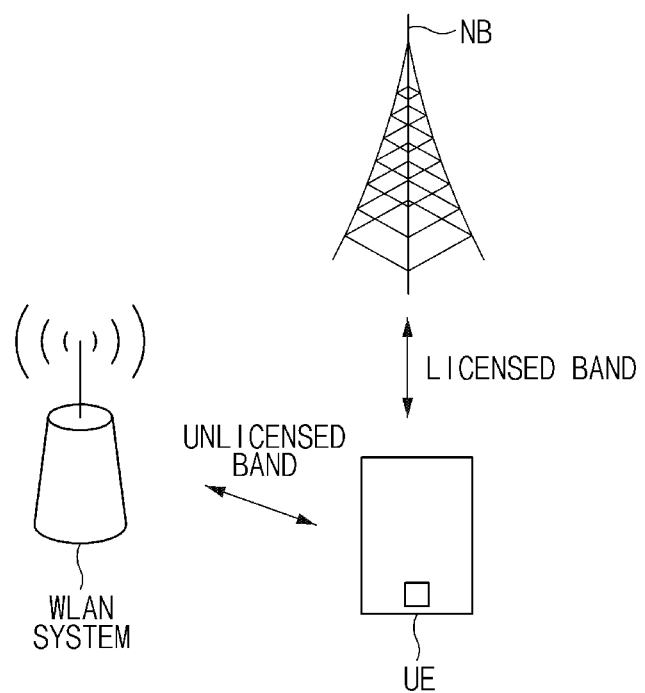
F I G. 1A

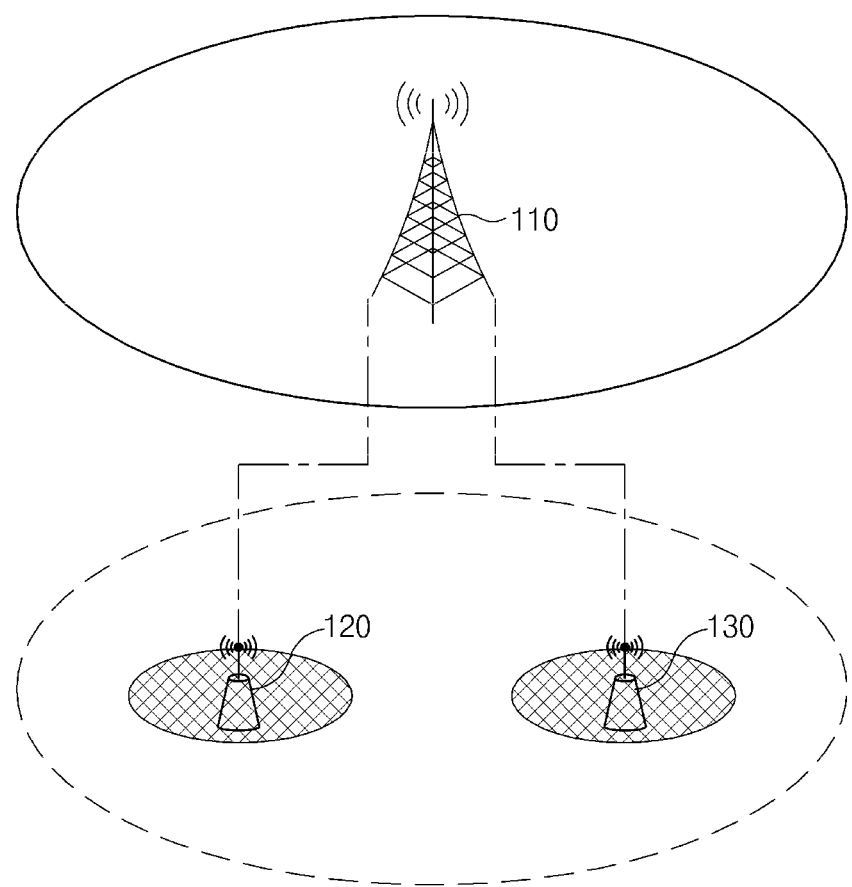
F I G. 1B

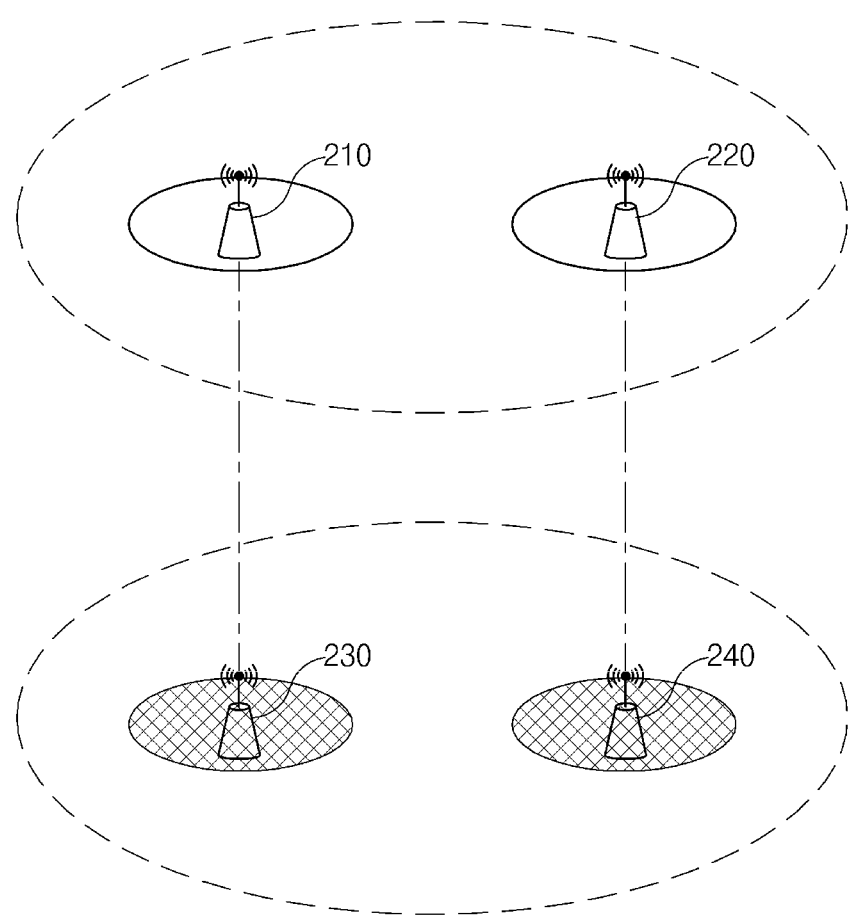
F I G. 1C

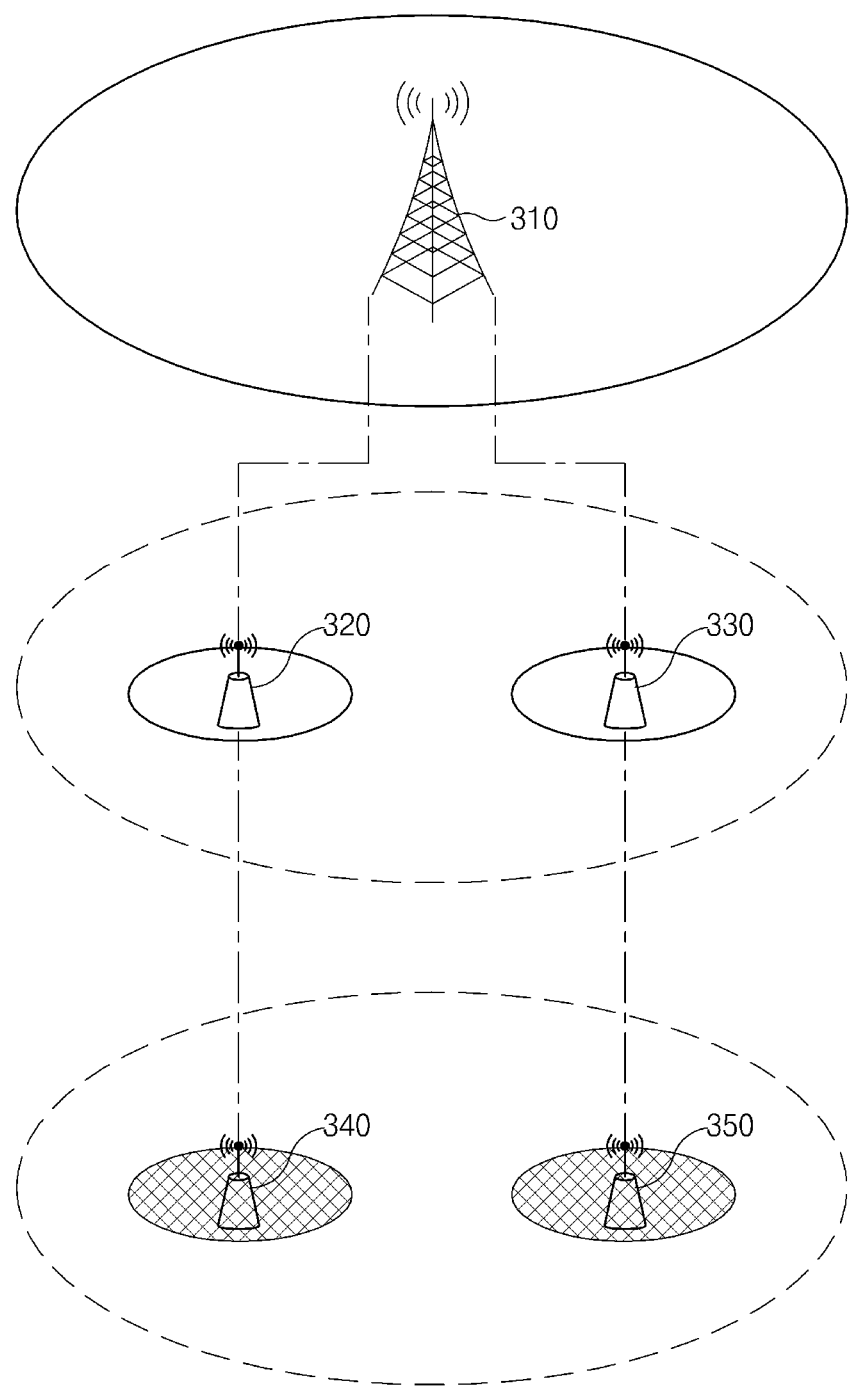
F I G. 1D

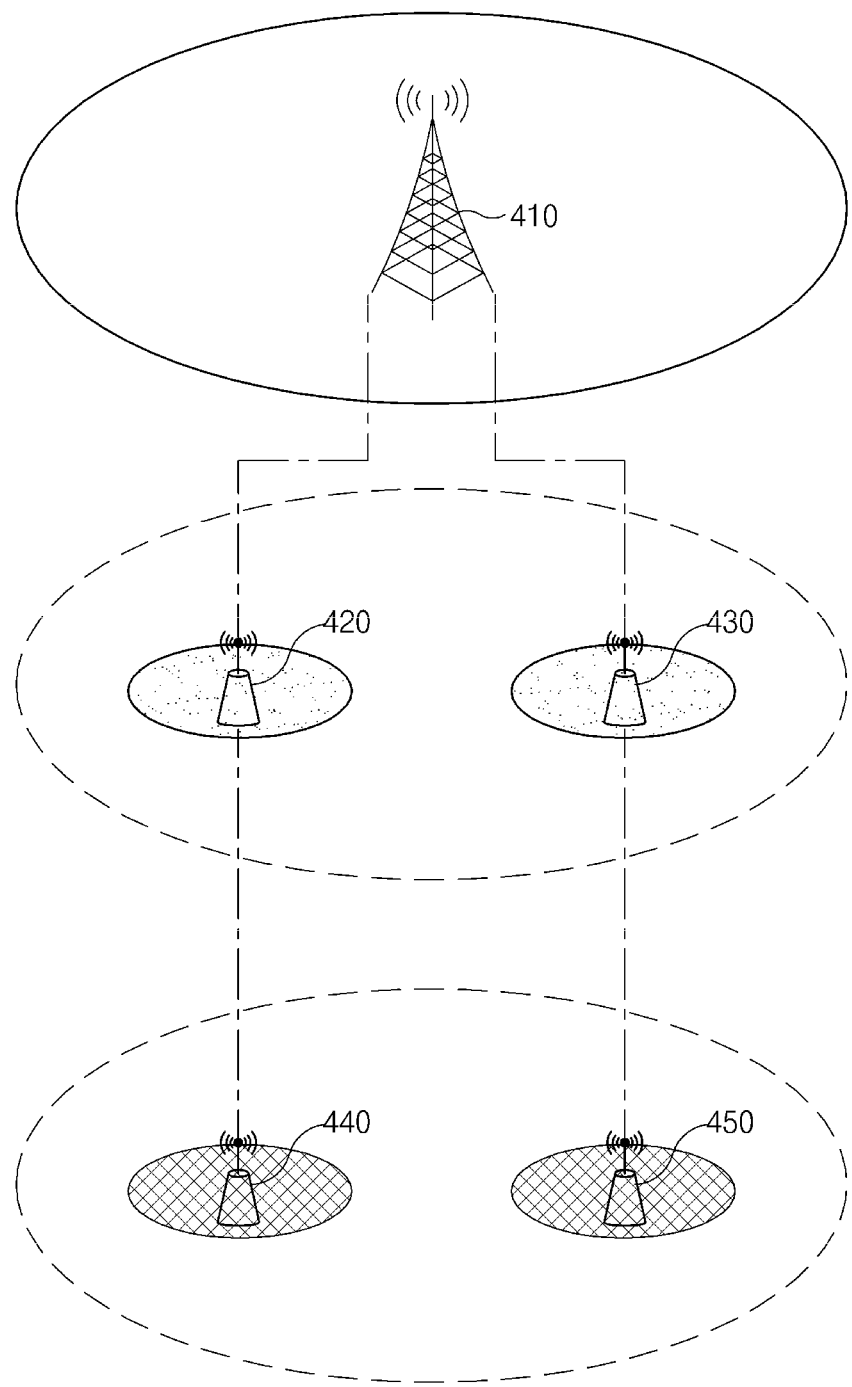
F I G. 1E

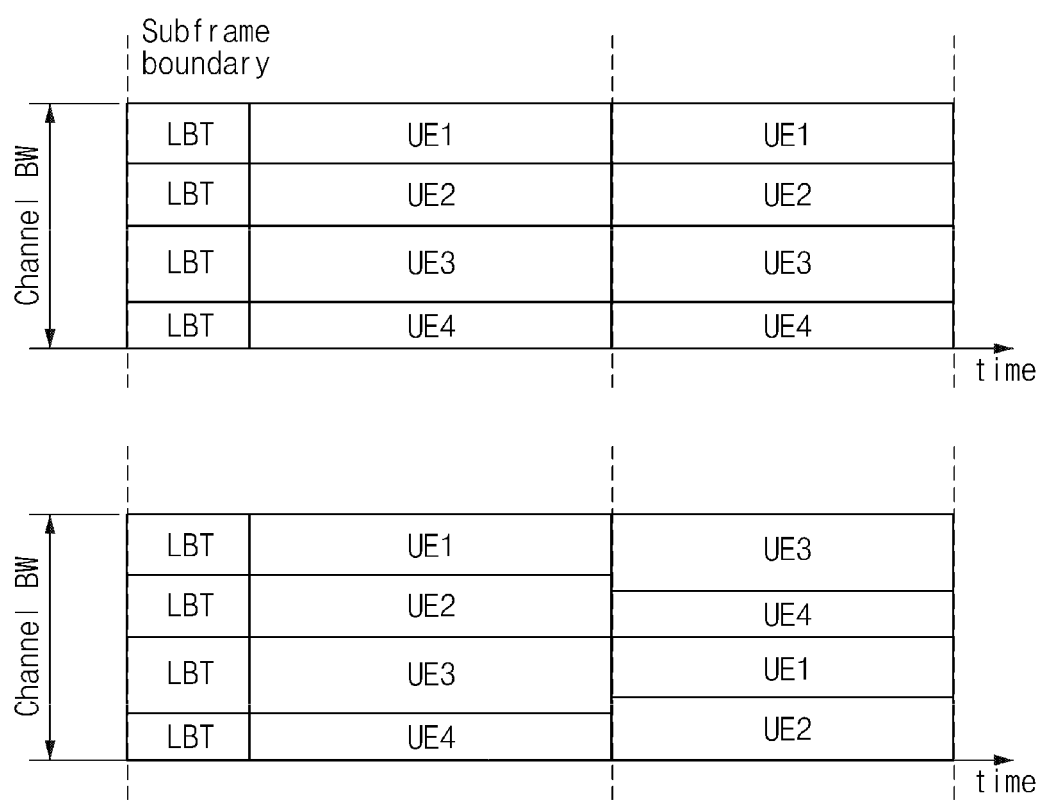
F I G. 3B

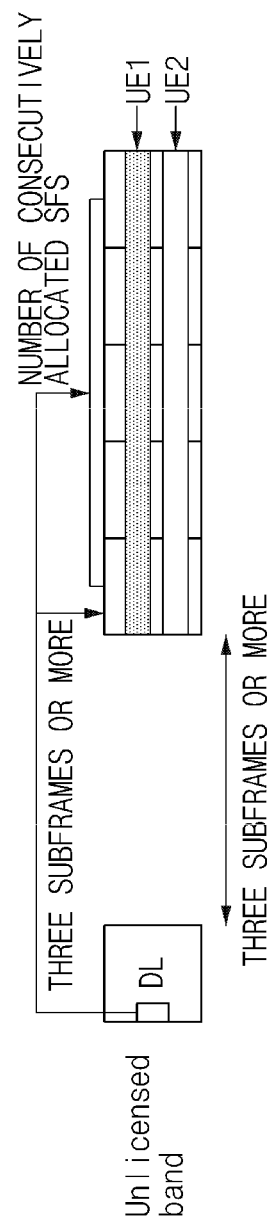
F I G . 4B

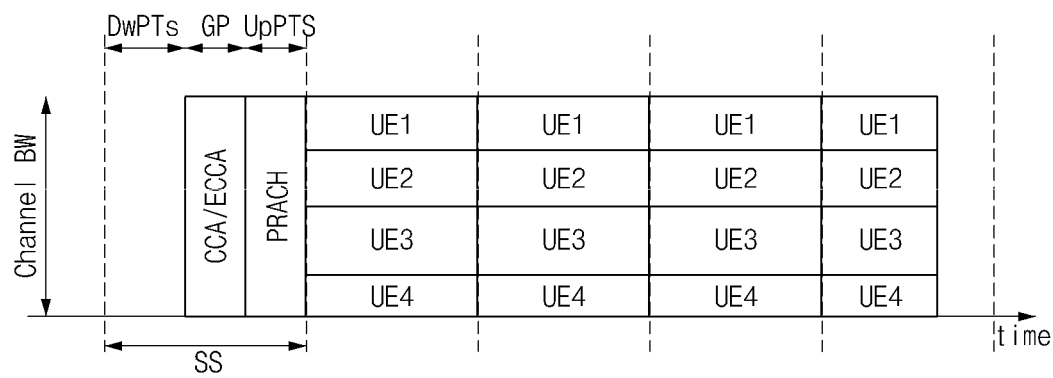
F I G. 5
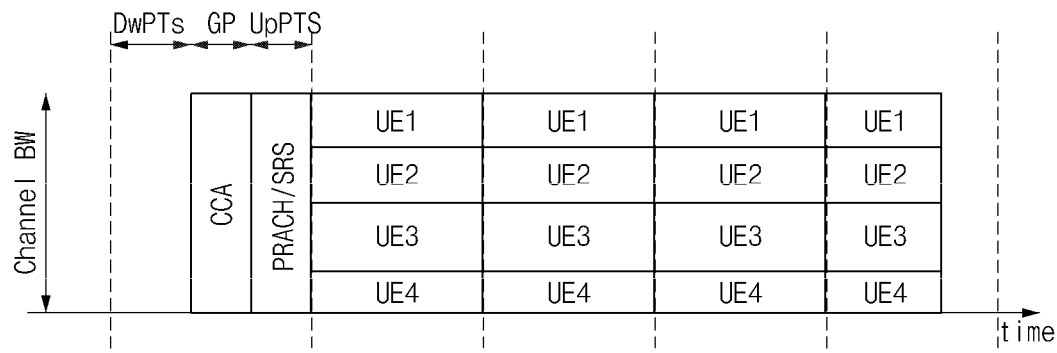
F I G. 6

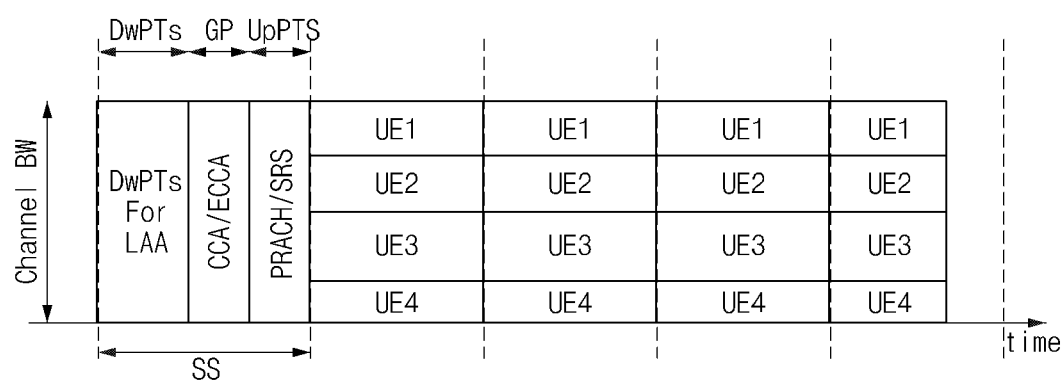
F I G. 8

METHOD FOR TRANSMITTING UPLINK DATA CONSIDERING HIDDEN NODE PROBLEM AND CHANNEL OCCUPATION OF USER TERMINALS

TECHNICAL FIELD

The present invention relates to a frequency sharing by using wireless communication system, in which a licensed band (e.g., LTE) system coexists with an unlicensed band system in an unlicensed band (e.g., WiFi) to commonly use the unlicensed band, and particularly, to an uplink data transmission method considering a hidden node problem and channel occupation of user terminals in an LTE-U (LTE in an unlicensed band) service.

BACKGROUND ART

With the development of information communication technology, various wireless communication technologies have been developed. The wireless communication technology can generally be classified into a wireless communication technology using a licensed band, a wireless communication technology using an unlicensed band (e.g., an industrial scientific medical (ISM) band), and the like according to a use band. Since a use right of the licensed band is exclusively given to one operator, the wireless communication technology using the licensed band can provide higher reliability and communication quality than the wireless communication technology using the unlicensed band.

A representative wireless communication technology using the licensed band includes long term evolution (LTE) stipulated in a $3^{rd}$ generation partnership project (3GPP) standard, and the like and each of a base station (NodeB, NB) and user equipment (UE) which support the LTE can transmit and receive a signal through the licensed band. A representative wireless communication technology using the unlicensed band includes a wireless local area network (WLAN) stipulated in an IEEE 802.11 standard, and the like and each of an access point (AP) and a station (STA) which support the WLAN can transmit and receive the signal through the unlicensed band.

Meanwhile, in recent years, mobile traffic has explosively increased and securing an additional licensed band is required to process (e.g., accommodate) the mobile traffic through the licensed band. However, since the licensed band is limited and a licensed band can be generally secured through a frequency band auction between operators, astronomical cost can be consumed in order to secure the additional licensed band. In order to solve the problem, a scheme that provides the LTE service through the unlicensed band can be considered. That is, since in a 5 GHz unlicensed band, wireless fidelity (WiFi) performs a commercial service, an LTE-U (LTE in an unlicensed band) service (alternatively, LAA service) technology is required, in which the LTE system coexists with the unlicensed band WiFi system in the WiFi unlicensed band to perform the service by commonly using the unlicensed band.

In the unlicensed band, a channel needs to be shared with a heterogeneous system such as the wireless LAN or the unlicensed band LTE of another operator. Accordingly, a process is required, which verifies an occupation state of the channel before transmitting data in order to remove or minimize a collision with another signal transmission. In this case, a channel access procedure for transmitting data without a mutual influence between terminals scheduled to the same uplink subframe should be defined. Further, the LTE schedules (alternatively, grants) an uplink resource through a downlink. One or more uplink subframes need to be simultaneously scheduled by considering an unlicensed band channel characteristic.

DISCLOSURE

Technical Problem

Accordingly, the present invention has been made in an effort to provide an uplink data transmission method in a frequency sharing by using wireless communication system, which considers a hidden node problem by performing clear channel assessment (CCA) in a user terminal and channel occupation based on an uplink signal of user terminals and adopts a method for generating and transferring a random back-off counter value in a base station so that all terminals similarly use a channel access parameter required for uplink subframe transmission in an unlicensed band and a downlink control method for scheduling uplink multiple subframes, in order to improve uplink transmission efficiency in an LTE-U service.

The technical objects of the present invention are not limited to the aforementioned technical objects, and other technical objects, which are not mentioned above, will be apparently appreciated to a person having ordinary skill in the art from the following description.

Technical Solution

First, when a characteristic of the present invention is summarized, in order to achieve the object, an uplink data transmission method for using an unlicensed band cell as a secondary cell in a wireless communication system using a licensed band according to an aspect of the present invention includes: notifying, by a base station, downlink control information (DCI) for multiple uplink subframes which each user terminal is occupiable by using a downlink subframe, and transmitting, by each user terminal, uplink data to multiple subframes indicated by the DCI by performing clear channel assessment (CCA) according to a listen before talking (LBT) scheme.

The multiple subframes indicated by the DCI may start in a subframe distant from the uplink subframe by three or more subframes. That is, the multiple uplink subframes indicated by the DCI may start in a subframe distant by three or more subframes from downlink subframe including the corresponding DCI.

The DCI may include a location of a start subframe which is occupiable or information on the number of multiple subframes which are consecutive or distant by a gap from the start subframe location.

The DCI may include scheduling information for different uplink subframes through two or more different DCIs by using one downlink subframe. The scheduling information of two or more respective different DCIs may include an index of the X value for designing a location n+4+X of an uplink subframe from an n-th downlink subframe including the corresponding DCI.

The DCI may include scheduling information for two or more different uplink subframes with one DCI by using one downlink subframe. The scheduling information may include information on the number of multiple consecutive uplink subframes including an n+4-th subframe after the n-th downlink subframe including the corresponding DCI.

The DCI may include information on the number of multiple consecutive uplink subframes including the n+4-th subframe after the n-th downlink subframe including the corresponding DCI, and an index of the X value for designating a location n+3+X of the uplink subframe.

The DCI may include a trigger field value designated while being mapped to a predetermined bit length included in the DCI transmitted by the base station, with respect to one or more scheduling information for configuring the uplink multiple subframes defined by a higher layer message or an RRC message received by the user terminal.

In the notifying of the DCI, the DCI may be notified by using the downlink subframe of the licensed band by a self-scheduling scheme.

In the notifying of the DCI, the DCI may be notified by using the downlink subframe of the unlicensed band by a cross carrier scheduling scheme.

In the transmitting of the uplink data, an FBE scheme in which each user terminal performs the CCA and thereafter, transmits the uplink data may be included.

In the transmitting of the uplink data, an LBE scheme in which each user terminal performs the CCA and thereafter, occupies a channel by transmitting a PRACH preamble and a channel reservation signal by using a UpPTS interval of a special subframe (SS) may be included.

In addition, an uplink data transmission method for using an unlicensed band cell as a secondary cell in a wireless communication system using a licensed band according to another aspect of the present invention includes: notifying, by a base station, downlink control information (DCI) for uplink subframes which each user terminal is occupiable by using a downlink subframe (e.g., the uplink data transmission method includes notifying, by a base station with a downlink subframe, downlink control information (DCI) for uplink subframes which each user terminal is occupiable); and transmitting, by each user terminal, uplink data to subframes indicated by the DCI by performing clear channel assessment (CCA) according to a listen before talking (LBT) scheme, wherein in the notifying of the DCI, the base station gives an uplink grant to each user terminal together with a common random back-off counter value, and in the transmitting of the uplink data, each user terminal similarly performs a count-down based on the random back-off counter value and thereafter, transmits the uplink data.

The uplink grant may be transmitted by using a DwPTS interval of a special subframe (SS).

The uplink grant may be transmitted by a self-scheduling scheme or a cross carrier scheduling scheme.

Advantageous Effects

According to embodiments of the present invention, in an uplink data transmission method in a frequency sharing by using wireless communication system, in an LTE-U service, a user terminal considers a hidden node problem by performing clear channel assessment (CCA) and considers channel occupation based on an uplink signal of another terminal, and the like and a channel access procedure required for uplink transmission of an unlicensed band and a multi-subframe scheduling scheme are applied to transmit uplink data of the unlicensed band, thereby improving uplink transmission efficiency.

DESCRIPTION OF DRAWINGS

FIG. 1A is a diagram for describing an environment of a frequency sharing by using wireless communication system 100 according to an embodiment of the present invention.

FIG. 1B is a diagram for describing a wireless communication network of a first embodiment of the present invention.

FIG. 1C is a diagram for describing a wireless communication network of a second embodiment of the present invention.

FIG. 1D is a diagram for describing a wireless communication network of a third embodiment of the present invention.

FIG. 1E is a diagram for describing a wireless communication network of a fourth embodiment of the present invention.

FIG. 3B as an exemplary diagram of uplink (UL) transmission in which the user terminals are scheduled to consecutive subframes in the frequency sharing by using wireless communication system 100 of the present invention illustrates an example in which the LBT is configured in front parts of all uplink subframes.

FIG. 4B is an exemplary diagram of a self-scheduling scheme in which the user terminals are scheduled to the multiple subframes in the frequency sharing by using wireless communication system 100 of the present invention.

FIG. 5 is a diagram for describing an example of a special subframe used in the frequency sharing by using wireless communication system 100 of the present invention.

FIG. 6 is a diagram for describing another example of the special subframe used in the frequency sharing by using wireless communication system 100 of the present invention.

FIG. 8 illustrates an example of uplink (UL) transmission in which the user terminals use a plurality of consecutive subframes in the frequency sharing by using wireless communication system 100 of the present invention.

BEST MODE

Figure 1F:
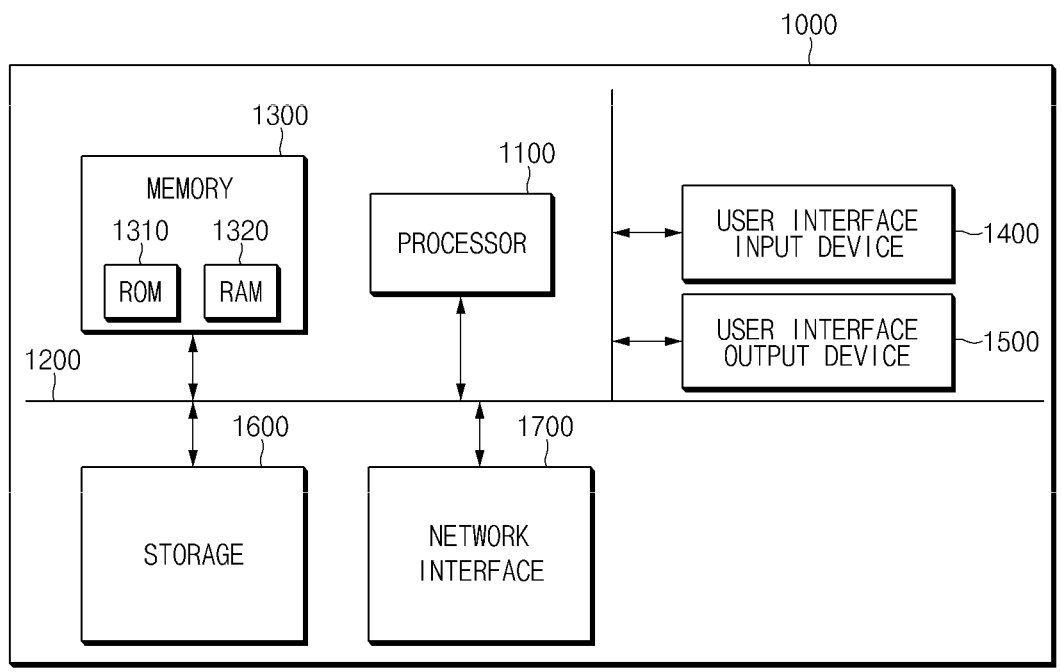
FIG. 1F is a diagram for describing an example of a method for implementing a communication node constituting the wireless communication network of the present invention.

Hereinafter, some embodiments of the present invention will be described in detail with reference to the exemplary drawings. When reference numerals refer to components of each drawing, it is noted that although the same components are illustrated in different drawings, the same components are designated by the same reference numerals as possible. In describing the embodiments of the present invention, when it is determined that the detailed description of the known components and functions related to the present invention may obscure understanding of the embodiments of the present invention, the detailed description thereof will be omitted.

Terms such as first, second, A, B, (a), (b), and the like may be used in describing the components of the embodiments of the present invention. The terms are only used to distinguish a component from another component, but nature or an order of the component is not limited by the terms. Further, if it is not contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the present application.

FIG. 1A is a diagram for describing an environment of a frequency sharing by using wireless communication system 100 according to an embodiment of the present invention.

As illustrated in FIG. 1A, the frequency sharing by using wireless communication system 100 according to the embodiment of the present invention as a licensed band wireless communication system which interlocks on a wireless communication network includes a base station (NB), user terminal(s) (user equipments, UE), and an unlicensed band wireless local area network (WLAN) system depending on a protocol such as WiFi, and the like as another licensed band wireless communication system.

Herein, the NB may become a type such as a mobile communication base station (Node B), eNB, home-eNB, a relay station, remote radio head (RRH), an access point (AP), and the like. The NB relays so that the UE in a macro cell receives a mobile communication service through backhaul in a licensed band according to a mobile communication protocol such as long term evolution (LTE), and the like.

Further, one or more WLAN systems which are present on the wireless communication network may be a type such as the AP forming a small cell such as a pico cell, a femto cell, and the like, and the like. The WLAN system relays so that the UE in the small cell receives a WLAN communication service such as Internet, and the like through sidehaul by an access using an unlicensed band (e.g., 5 GHz band) such as the WiFi, and the like according to the protocol such as the WLAN, and the like.

A method is proposed, in which in the frequency sharing by using wireless communication system 100 of the present invention, that is, a wireless communication licensed band (e.g., LTE) system using the unlicensed band (e.g., WiFi) (cell) as a secondary (cell), in an LTE-U service given between the licensed band (e.g., LTE) systems by commonly using the unlicensed band through coexistence with the unlicensed band wireless communication WLAN system, when the licensed band (e.g., LTE) systems perform licensed band (e.g., LTE) data transmission/reception using the unlicensed band (e.g., WiFi), in the LTE-U service, the user terminal considers a hidden node problem by performing clear channel assessment (CCA) and considers channel occupation based on an uplink signal of another terminal, and the like to transmit uplink data, thereby improving uplink transmission efficiency.

Hereinafter, various embodiments of a wireless communication network to which embodiments of the present invention are applied will be described. The wireless communication network to which the embodiments of the present invention are applied is not limited to contents described below and the embodiments of the present invention may be applied to various wireless communication networks.

FIG. 1B is a diagram for describing a wireless communication network of a first embodiment of the present invention.

Referring to FIG. 1B, the wireless communication system 100 according to the present invention may include a base station (NB) 110 and WLAN systems 120 and 130 on the wireless communication network.

The base station (NB) 110 may support cellular communication (e.g., long term evolution (LTE), LTE-A (advanced), LTE-U (unlicensed), and the like stipulated in a $3^{rd}$ generation partnership project (3GPP) standard). The base station (NB) 110 may support multiple input multiple output (MIMO) (e.g., single user (SU)-MIMO, multi user (MU)-MIMO, massive MIMO, and the like), coordinated multi-point (CoMP), carrier aggregation (CA), and the like. The base station (NB) 110 may operate in a licensed band (F1) and form the macro cell. The base station (NB) 110 may be connected with another base station (NB) or the WLAN systems 120 and 130 through ideal backhaul or non-ideal backhaul.

The WLAN systems 120 and 130 may be positioned under coverage of the base station (NB) 110, operate in an unlicensed band (F3), and form the small cell. Each of the WLAN systems 120 and 130 may support the wireless local area network (WLAN) stipulated in an institute of electrical and electronics engineers (IEEE) 802.11 standard.

Each of the base station (NB) 110 and the user terminal(s) (UE) (not illustrated) which access the base station (NB) 110 may transmit and receive a signal through the carrier aggregation (CA) between the licensed band (F1) and the unlicensed band (F3).

FIG. 1C is a diagram for describing a wireless communication network of a second embodiment of the present invention.

Referring to FIG. 1C, the wireless communication system 100 according to the present invention may include base stations (NB) 210 and 220 and WLAN systems 230 and 240 on the wireless communication network.

The respective base stations (NB) 210 and 220 may support cellular communication (e.g., the LTE, the LTE-A, the LTE-U, and the like stipulated in the 3GPP standard). Each of the base stations (NB) 210 and 220 may support the MIMO (e.g., SU-MIMO, MU-MIMO, the massive MIMO, and the like), the CoMP, the carrier aggregation (CA), and the like. The respective base stations (NB) 210 and 220 may operate in the licensed band (F1) and form the small cell. The respective base stations (NB) 210 and 220 may be positioned under coverage of another base station forming the macro cell. A first base station (NB) 210 may be connected with a first WLAN system 230 through the ideal backhaul or non-ideal backhaul. A second base station (NB) 220 may be connected with a second WLAN system 240 through the ideal backhaul or non-ideal backhaul.

The first WLAN system 230 may be positioned under coverage of the first base station (NB) 210. The first WLAN system 230 may operate in the unlicensed band (F3) and form the small cell. The second WLAN system 240 may be positioned under coverage of the second base station (NB) 220. The second WLAN system 240 may operate in the unlicensed band (F3) and form the small cell. Each of the WLAN systems 230 and 240 may support the WLAN stipulated in the IEEE 802.11 standard.

Each of the first base station (NB) 210, the user terminal (UE) accessing the first base station (NB) 210, the second base station (NB) 220, and the user terminal (UE) accessing the second base station (NB) 220 may transmit and receive the signal through the carrier aggregation (CA) between the licensed band (F1) and the unlicensed band (F3).

FIG. 1D is a diagram for describing a wireless communication network of a third embodiment of the present invention.

Referring to FIG. 1D, the wireless communication system 100 according to the present invention may include base stations (NB) 310, 320, and 330 and WLAN systems 340 and 350 on the wireless communication network.

Each of the first base station (NB) 310, the second base station (NB) 320, and the third base station (NB) 330 may support the cellular communication (e.g., the LTE, the LTE-A, the LTE-U, and the like stipulated in the 3GPP standard). Each of the first base station (NB) 310, the second base station (NB) 320, and the third base station (NB) 330 may support the MIMO (e.g., the SU-MIMO, the MU-MIMO, the massive MIMO, and the like), the CoMP, the carrier aggregation (CA), and the like. The first base station (NB) 310 may operate in the licensed band (F1) and form the macro cell. The first base station (NB) 310 may be connected with another base station (e.g., the second base station (NB) 320, the third base station (NB) 330, and the like through the ideal backhaul or non-ideal backhaul. The second base station (NB) 320 may be positioned under coverage of the first base station (NB) 310. The second base station (NB) 320 may operate in the licensed band (F1) and form the small cell. The third base station (NB) 330 may be positioned under coverage of the first base station (NB) 310. The third base station (NB) 330 may operate in the licensed band (F1) and form the small cell.

The second base station (NB) 320 may be connected with a first WLAN system 340 through the ideal backhaul or non-ideal backhaul. The first WLAN system 340 may be positioned under coverage of the second base station (NB) 320. The first WLAN system 340 may operate in the unlicensed band (F3) and form the small cell. The third base station (NB) 330 may be connected with a second WLAN system 350 through the ideal backhaul or non-ideal backhaul. The second WLAN system 350 may be positioned under coverage of the third base station (NB) 330. The second WLAN system 350 may operate in the unlicensed band (F3) and form the small cell. Each of the first WLAN system 340 and the second WLAN system 350 may support the WLAN stipulated in the IEEE 802.11 standard.

Each of the first base station (NB) 310, a UE (not illustrated) accessing the first base station (NB) 310, the second base station (NB) 320, a UE (not illustrated) accessing the second base station (NB) 320, and the third base station (NB) 330, and a UE (not illustrated) accessing the third base station (NB) 330 may transmit and receive the signal through the carrier aggregation (CA) between the licensed band (F1) and the unlicensed band (F3).

FIG. 1E is a diagram for describing a wireless communication network of a fourth embodiment of the present invention.

Referring to FIG. 1E, the wireless communication system 100 according to the present invention may include base stations (NB) 410, 420, and 430 and WLAN systems 440 and 450 on the wireless communication network.

Each of the first base station (NB) 410, the second base station (NB) 420, and the third base station (NB) 430 may support the cellular communication (e.g., the LTE, the LTE-A, the LTE-U, and the like stipulated in the 3GPP standard). Each of the first base station (NB) 410, the second base station (NB) 420, and the third base station (NB) 430 may support the MIMO (e.g., the SU-MIMO, the MU-MIMO, the massive MIMO, and the like), the CoMP, the carrier aggregation (CA), and the like. The first base station (NB) 410 may operate in the licensed band (F1) and form the macro cell. The first base station (NB) 410 may be connected with another base station (e.g., the second base station (NB) 420, the third base station (NB) 430, and the like through the ideal backhaul or non-ideal backhaul. The second base station (NB) 420 may be positioned under coverage of the first base station (NB) 410. The second base station (NB) 420 may operate in the licensed band (F2) and form the small cell. The third base station (NB) 430 may be positioned under coverage of the first base station (NB) 410. The third base station (NB) 430 may operate in the licensed band (F2) and form the small cell. The second base station (NB) 420 and the third base station (NB) 430 may operate in the licensed band (F1) and another licensed band (F2) in which the first base station (NB) 410 operates, respectively.

The second base station (NB) 420 may be connected with a first WLAN system 440 through the ideal backhaul or non-ideal backhaul. The first WLAN system 440 may be positioned under coverage of the second base station (NB) 420. The first WLAN system 440 may operate in the unlicensed band (F3) and form the small cell. The third base station (NB) 430 may be connected with a second WLAN system 450 through the ideal backhaul or non-ideal backhaul. The second WLAN system 450 may be positioned under coverage of the third base station (NB) 430. The second WLAN system 450 may operate in the unlicensed band (F3) and form the small cell. Each of the first WLAN system 440 and the second WLAN system 450 may support the WLAN stipulated in the IEEE 802.11 standard.

Each of the first base station (NB) 410 and the UE (not illustrated) which access the first base station (NB) 410 may transmit and receive the signal through the carrier aggregation (CA) between the licensed band (F1) and the unlicensed band (F3). Each of the second base station (NB) 420, the UE accessing the second base station (NB) 420, the third base station (NB) 430, and the UE accessing the third base station (NB) 430 may transmit and receive the signal through the carrier aggregation (CA) between the licensed band (F2) and the unlicensed band (F3).

Communication nodes (that is, the base station, the WLAN system, the UE, and the like) constituting the above described wireless communication network may transmit the signal based on a listen before talk (LBT) procedure in the unlicensed band. That is, the communication node performs an energy detection operation to determine an occupation state of the unlicensed band. When it is determined that the unlicensed band is in an idle state, the communication node may transmit the signal. In this case, the communication node may transmit the signal when the unlicensed band is in the idle state during a contention window depending on a random back-off operation. On the contrary, when it is determined that the unlicensed band is in a busy state, the communication node may not transmit the signal.

Alternatively, the communication node may transmit the signal based on a carrier sensing adaptive transmission (CSAT) procedure. That is, the communication node may transmit the signal based on a predetermined duty cycle. The communication node may transmit the signal when a current duty cycle is a duty cycle allocated for the communication node that supports the cellular communication. On the contrary, the communication node may not transmit the signal when the current duty cycle is a duty cycle allocated for a communication node that supports communication (e.g., the WLAN, and the like) other than the cellular communication. The duty cycle may be adaptively determined based on the number of communication nodes which support the WLAN which is present in the unlicensed band, a use state of the unlicensed band, and the like.

The communication node may perform discontinuous transmission in the unlicensed band. For example, when a maximum transmission duration or a maximum channel occupancy time (maximum COT) is set in the unlicensed band, the communication node may transmit the signal within the maximum transmission duration and when all signals may not be transmitted within the maximum transmission duration in a current link, residual signals may be transmitted in the maximum transmission duration in a next link. Further, the communication node may select a carrier having relatively small interference in the unlicensed band and operate in the selected carrier. In addition, when the communication node transmits the signal in the unlicensed band, the communication node may control transmission power in order to reduce interference in another communication node.

Meanwhile, the communication node may support a code division multiple access (CDMA) based communication protocol, a wideband CDMA (WCDMA) based communication protocol, a time division multiple access (TDMA) based communication protocol, a frequency division multiple access (FDMA) based communication protocol, a single carrier (SC)-FDMA based communication protocol, an orthogonal frequency division multiplexing (OFDM) based communication protocol, an orthogonal frequency division multiple access (OFDMA) based communication protocol, and the like.

Among the communication nodes, the base station may be designated as a node B (NB), an evolved NodeB (eNB), a base transceiver station (BTS), a radio base station, a radio transceiver, an access point (AP), an access node, and the like. Among the communication nodes, the UE may be designated as a terminal, an access terminal, a mobile terminal, a station, a subscriber station, a portable subscriber station, a mobile station, a node, a device, and the like.

The communication node may have a structure illustrated in FIG. 1F.

FIG. 1F is a diagram for describing an example of a method for implementing a communication node constituting the wireless communication network of the present invention. The communication node according to the embodiment of the present invention may be constituted by hardware, software, or combinations thereof. For example, the communication nodes including the base station, the WLAN system, the UE, and the like may be implemented as a computing system 1000 illustrated in FIG. 1F.

The computing system 1000 may include at least one processor 1100, a memory 1300, a user interface input device 1400, a user interface output device 1500, a storage 1600, and a network interface 1700 connected through a bus 1200. The processor 1100 may be a semiconductor device that executes processing of commands stored in a central processing unit (CPU) or the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Therefore, steps of a method or an algorithm described in association with the embodiments disclosed in the specification may be directly implemented by hardware and software modules executed by the processor 1100, or a combination thereof. The software module may reside in storage media (that is, the memory 1300 and/or the storage 1600) such as a RAM, a flash memory, a ROM, an EPROM, an EEPROM, a register, a hard disk, a removable disk, and a CD-ROM. The exemplary storage medium is coupled to the processor 1100 and the processor 1100 may read information from the storage medium and write the information in the storage medium. As another method, the storage medium may be integrated with the processor 1100. The processor and the storage medium may reside in an application specific integrated circuit (ASIC). The ASIC may reside in the user terminal. As yet another method, the processor and the storage medium may reside in the user terminal as individual components.

Next, operation methods of the communication nodes in the wireless communication network will be described. Even when a method (e.g., transmission or reception of the signal) performed by a first communication node among the communication nodes is described, a second communication node corresponding to the first communication node may perform a method (e.g., reception or transmission of the signal) corresponding to the method performed by the first communication node. That is, when the operation of the user terminal (UE) is described, the base station (NB) corresponding to the user terminal (UE) may perform an operation corresponding to the operation of the user terminal (UE). On the contrary, when the operation of the base station (NB) is described, the user terminal (UE) corresponding to the base station (NB) may perform an operation corresponding to the operation of the base station (NB).

In an LTE downlink, one subframe is constituted by 2 slots. Each slot is constituted by 7 or 6 OFDM symbols. A maximum of 3 or 4 OFDM symbols configured in a front part of the subframe include control channels. Examples of downlink control channels used in the licensed band include a physical control format indicator channel (PCFICH), a physical downlink control channel (PDCCH), a physical hybrid-ARQ indicator channel (PHICH), and the like. A data channel physical downlink shared channel (PDSCH) for data transmission may be fundamentally allocated to the remaining parts in the subframe and an enhanced physical downlink control channel (EPDCCH) may be allocated to some resource blocks (RBs).

In the subframe, a first OFDM symbol includes the PCFICH to transmit information on the number of OFDM symbols used for control channel transmission. Further, a control channel region may include the PHICH to transmit an HARQ acknowledgment/negative-acknowledgment (ACK/NACK) signal that is response information to uplink transmission. Downlink control information (DCI) is transmitted through the PDCCH and the ePDCCH ((E)PDCCH)). The DCI may include resource allocation information or resource control information for terminals and multiple terminal groups. As an example, the DCI may include uplink scheduling information or downlink scheduling information, an uplink transmit power control command, and the like.

The DCI as the control information transmitted to the (E)PDCCH has different formats according to types and the number of information fields, the number of bits of each information field, and the like. DCI formats 0, 3, 3A, 4, and 4A may be defined for an uplink and formats including DCI formats 1, 1A, 1B, 1C, 1D, 2, 2A, 2B, 2C, 2D, and the like may be defined for a downlink. Each DCI format selectively includes information such as a carrier indicator field (CIF), RB assignment, a modulation coding scheme (MCS), a redundancy version (RV), a new data indicator (NDI), a transmit power control (TPC), an HARQ process number, precoding matrix indicator (PMI) confirmation, a hopping flag, a flag field, and the like according to the format. Therefore, the size of the control information suitable for the DCI format may vary. Further, the same DCI format may be used for transmitting two or more types of control information. In this case, the control information is segmented by the DCI format flag field. In [Table 1] given below, the information included in each DCI format is summarized.

TABLE 1

| DCI Format | Information |
| --- | --- |
| Format 0 | Resource grants for the PUSCH transmissions (uplink) |
| Format 1 | Resource assignments for single codeword PDSCH transmissions (transmission modes 1, 2 and 7) |

TABLE 1-continued

| DCI Format | Information |
| --- | --- |
| Format 1A | Compact signaling of resource assignments for single codeword PDSCH (all modes) |
| Format 1B | Compact resource assigments for PDSCH using rank-1 closed loop precoding (mode 6) |
| Format 1C | Very compact resource assignments for PDSCH (e.g. paging/broadcast system information) |
| Format 1D | Compact resource assignments for PDSCH using multi-user MIMO (mode 5) |
| Format 2 | Resource assignments for PDSCH for closed-loop MIMO operation (mode 4) |
| Format 2A | Resource assignments for PDSCH for open-loop MIMO operation (mode 3) |
| Format 3/3A | Power control commands for PUCCH and PUSCH with 2-bit/1-bit power adjustments |

The (E)PDCCH is transmitted as an aggregation of one or a plurality of consecutive (enhanced) consecutive control channel elements ((E)CCEs). The (E)CCE as a logic allocation unit is constituted by a plurality of resource element groups (REGs). The number of bits transmitted to the (E)PDCCH is determined according to a relationship between the number of (E)CCEs and a code rate provided by the (E)CCEs.

Cyclic redundancy check (CRC) for error detection is attached to the control information transmitted to the (E)PDCCH according to the DCI format. An identifier radio network temporary identifier (RNTI) is masked with the CRC according to an (E)PDCCH receiving target (the terminal, the UE, the STA, and the like) or a purpose. In more detail, a CRC scrambled as the RNTI is attached. A type and a corresponding value of the RNTI may be organized as shown in [Table 2] given below. The purpose of each RNTI is shown in [Table 3].

TABLE 2

| Value (hexa-decimal) | RNTI |
| --- | --- |
| 0000 | N/A |
| 0001-003C | RA-RNTI, C-RNTI, Semi-Persistent Scheduling C-RNTI, Temporary C-RNTI, eIMTA-RNTI, TPC-PUCCH-RNTI, TPC-PUSCH-RNTI and SL-RNTI |
| 003D-FFF3 | C-RNTI, Semi-Persistent Scheduling C-RNTI, eIMTA-RNTI, Temporary C-RNTI, TPC-PUCCH-RNTI, TPC-PUSCH-RNTI and SL-RNTI |
| FFF4-FFFC | Reserved for future use |
| FFFD | M-RNTI |
| FFFE | P-RNTI |
| FFFF | SI-RNTI |

TABLE 3

| RNTI | Purpose |
| --- | --- |
| P-RNTI | Paging and System Information change notification |
| SI-RNTI | Broadcast of System Information |
| M-RNTI | MCCH Information Change notification |
| RA-RNTI | Random Access Response |
| eIMTA-RNTI | eIMTA TDD UL/DL Configuration Notification |
| Temporary C-RNTI | Contention Resolution (when no valid C-RNTI is available) |
| Temporary C-RNTI | Msg3 transmission |
| C-RNTI | Dynamically scheduled unicast transmission (uplink or downlink) |
| C-RNTI | Triggering of PDCCH ordered random access |
| Semi-Persistent Scheduling C-RNTI | Semi-Persistently scheduled unicast transmission(activation, reactivation and retransmission) |

TABLE 3-continued

| RNTI | Purpose |
| --- | --- |
| Semi-Persistent Scheduling C-RNTI | Semi-Persistently scheduled unicast transmission (deactivation) |
| TPC-PUCCH-RNTI | Physical layer uplink power control |
| TPC-PUSCH-RNTI | Physical layer uplink power control |
| SL-RNTI | Dynamically scheduled sidelink transmission |

Identifiers associated with the unlicensed band cells may be defined as follows. Herein, for easy description, the identifiers are named an unlicensed cell-RNTI (U-RNTI) or CC-RNTI as a designated identifier of common information on the unlicensed band. The U-RNTI or CC-RNTI defined in the present invention may be named differently according to unlicensed band cell information. A value for the U-RNTI or CC-RNTI may be transferred to the terminal by a higher layer message or a radio resource control (RRC) message. The value of the U-RNTI or CC-RNTI defined in the present invention may be known by RRC signaling. In respect to the U-RNTI or CC-RNTI defined in the present invention or mentioned as an embodiment, a DCI including CRC masked with the U-RNTI or CC-RNTI may be transmitted to an unlicensed band PDCCH common search space. The DCI including the CRC masked with the U-RNTI or CC-RNTI may include the common control information of the unlicensed band cell. As an embodiment, information on a partial subframe having a smaller length than 1 ms transmission time interval (TTI) of a downlink transmission burst may be included in the DCI. Alternatively, uplink common control information of the unlicensed band may be included in the DCI. As an embodiment, a random back-off counter value for channel access of an uplink transmission burst may be included in the DCI. Alternatively, as an embodiment, the number of consecutive scheduled uplink subframes may be designated in the DCI.

[Multi-Subframe Structure]

Meanwhile, in a European telecommunications standards institute (ETSI) standard, a radio device in all unlicensed bands (e.g., 5 GHz band) requires channel sensing before transmission. Therefore, in the case of LTE-U (alternatively, LAA) downlink (DL)+uplink (UL) transmission, all communication nodes including the base station (NB), the user terminal (UE), and the like may require the channel sensing. When the user terminal (UE) performs the channel sensing, the hidden node problem may be reduced.

However, when different user terminals (UEs) are allocated to different subframes of the uplink transmission burst (transmission in which one or more uplink subframes are consecutive is used while being defined as the uplink transmission burst in the present invention), the channel sensing may be required for every subframe. In this case, transmission efficiency may deteriorate and a channel occupancy opportunity may be missed. Accordingly, in order to reduce the channel sensing, it is effective to consecutively allocate the user terminal (UE) allocated to an uplink constituted by N (natural number) subframes to N subframes from a corresponding first subframe. In this case, multiple subframe scheduling consecutively using the same resource block (RB) or resource blocks (RBs) having a specific pattern may be considered. In the LBT scheme, in the case of load based equipment (LBE), after another random back-off, a signal (channel reservation signal) for channel occupancy may be transmitted in order to observe a subframe boundary. In this case, the user terminal (UE) determines that the channel is occupied by a signal (channel reservation signal) for channel occupancy of another terminal and may not transmit the uplink data. Therefore, it is preferable to avoid the channel sensing between the subframes in the uplink burst.

As described above, in the LTE-U (alternatively, LAA) service of the frequency sharing by using wireless communication system 100, when the user terminal (UE) performs the channel sensing (alternatively, carrier sensing), the hidden node problem may be reduced by performing the clear channel assessment (CCA). For example, when the user terminal (UE) detects a preamble of a received subframe and a received signal of a corresponding channel is larger than a predetermined CCA threshold, it may be determined that another terminal or the unlicensed band (e.g., WiFi) WLAN system occupies the corresponding channel. In this case, a method for discovering a hidden node (e.g., the WLAN system) having a weak received signal strength by appropriately changing (e.g., reducing) the CCA threshold and reducing interference therewith may be performed.

Further, when a received signal level is larger than a predetermined threshold based on an uplink signal to the base station (NB) of another terminal in the LTE-U (alternatively, LAA) service, the user terminal (UE) determines that the corresponding channel is occupied and manages the uplink signal not to be transmitted during a corresponding interval to avoid the interference by the uplink signal of the terminal that occupies the corresponding channel.

Accordingly, when the user terminal (UE) performs the channel sensing in the LTE-U (alternatively, LAA) service, a method for preventing determination of the channel occupancy with a signal of another user terminal (UE) allocated to the same subframe is required. As one method, the channel sensing may be performed by using one subframe among data frames as the special subframe.

[UL Scheduling]

For example, when the user terminal (UE) transmits the uplink (UL) data, it is assumed that the user terminal (UE) transmits the uplink (UL) data to an n-th subframe or the subsequent subframe among consecutive subframes.

If an (n−4)-th downlink (DL) subframe that enables the self-scheduling is not present in the unlicensed band (e.g., WiFi), the user terminal (UE) may receive an opportunity to transmit the uplink (UL) data within M (natural number) subframe windows (UL opportunistic windows) from the n-th subframe.

If the (n−4)-th downlink (DL) subframe that enables self-scheduling is present in the unlicensed band (e.g., WiFi), using the self-scheduling is more preferable than using the cross-carrier scheduling.

[UE Multiplexing on Multiple Subframes]

For a multiplexing LTE-U (alternatively, LAA) service of the user terminals (UEs) by using multiple consecutive subframes, in the case of DL+UL (downlink and uplink) transmission of licensed band (e.g., LTE) data using the unlicensed band (e.g., WiFi), the user terminals (UEs) perform the clear channel assessment (CCA) according to the listen before talking (LBT) scheme before transmitting the uplink (UL) data according to a regulatory. If uplink (UL) resources of the respective user terminals (UEs) are different from each other (see FIG. 2), overhead for performing the CCA may increase. Further, the uplink (UL) transmission by any one user terminal (UE) may influence performing the CCA by the user terminals scheduled for the uplink (UL) transmission to the next subframe and interrupt the uplink (UL) transmission. The listen before talking (LBT) is a scheme that selects another channel which is not occupied when it is determined that the channel of the unlicensed band is occupied by determining whether the channel of the unlicensed band is occupied and used by another terminal.

As another problem, when M (natural number) subframe windows (UL opportunistic windows) from the n-th subframe are used, the uplink (UL) signals of the user terminals may collide with each other.

In the following drawings, it is illustrated that as resources used by the respective user terminals (UEs), some of all frequencies are not physically used but the frequency resources are logically segmented and used, and actually used frequencies are transmitted while being scattered to subcarriers of all bands.

Figure 2A:
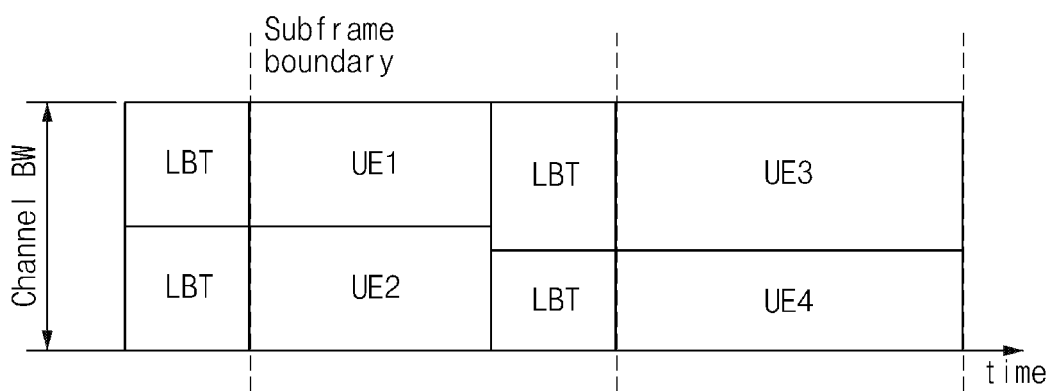
FIG. 2A as an exemplary diagram in which different user terminals are scheduled and uplink (UL) transmitted for each subframe in the frequency sharing by using wireless communication system 100 of the present invention illustrates an example in which LBT is configured in the rear parts of all uplink subframes.

FIG. 2A as an exemplary diagram in which different user terminals are scheduled and uplink (UL) transmitted for each subframe in the frequency sharing by using wireless communication system 100 of the present invention illustrates an example in which LBT is configured in the rear of a subframe. FIG. 2A as an exemplary diagram in which different user terminals are scheduled and uplink (UL) transmitted for each subframe in the frequency sharing by using wireless communication system 100 of the present invention illustrates an example in which the LBT is configured in the subframe.

Figure 2B:
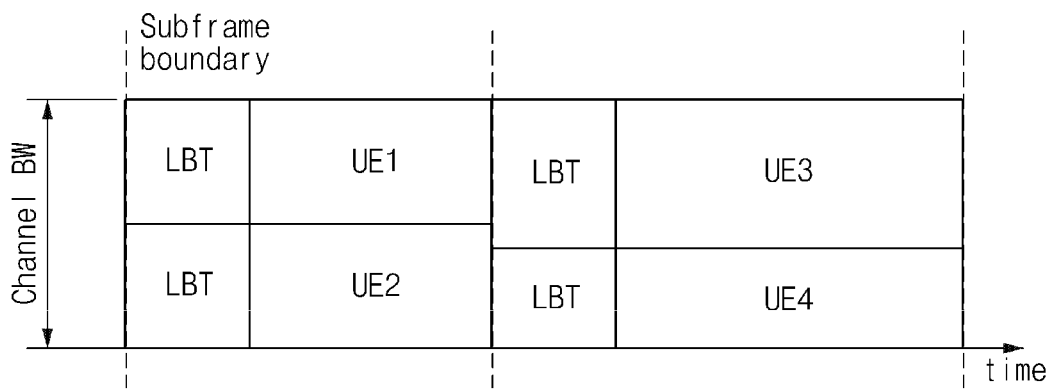
FIG. 2B as an exemplary diagram in which different user terminals are scheduled and uplink (UL) transmitted for each subframe in the frequency sharing by using wireless communication system 100 of the present invention illustrates an example in which the LBT is configured in front parts of all uplink subframes.

When the base station (NB) schedules (resource-allocates) terminals UE1 and UE2 to the N-th subframe and schedules terminals UE3 and UE4 to an N+1-th subframe as illustrated in FIGS. 2A and 2B, all of the user terminals UE1, UE2, UE3, and UE4 may perform the LBT-scheme CCA and when the unlicensed band (e.g., WiFi) signal is present in the N-th subframe, all of the user terminals UE1, UE2, UE3, and UE4 may attempt the uplink (UL) transmission to the N+1-th subframe. It is assumed that two different terminals are scheduled for each subframe and the LBT is performed before each subframe starts. A location for performing the LBT may be a rear part or a front part of the subframe.

FIGS. 2A and 2B illustrate an example in which the terminals UE3 and UE4 do not use some resources for transmission. In this case, all uplink transmission amounts may be reduced by an LBT resource.

The LBT of FIGS. 2A and 2B is not segmented in a frequency domain but segmented as a concept in which each terminal performs transmission in a time domain. Further, the transmission resource of each terminal means not using only a part of an entire bandwidth but logically using a predetermined quantity of resources. Accordingly, locations of resources actually physically allocated and used for transmission may be distributed to the entire band.

Since all UEs need to perform the CCA before the uplink (UL) transmission as illustrated in FIGS. 2A and 2B, when different user terminals are scheduled for each subframe, overhead of resource use may occur.

Figure 3A:
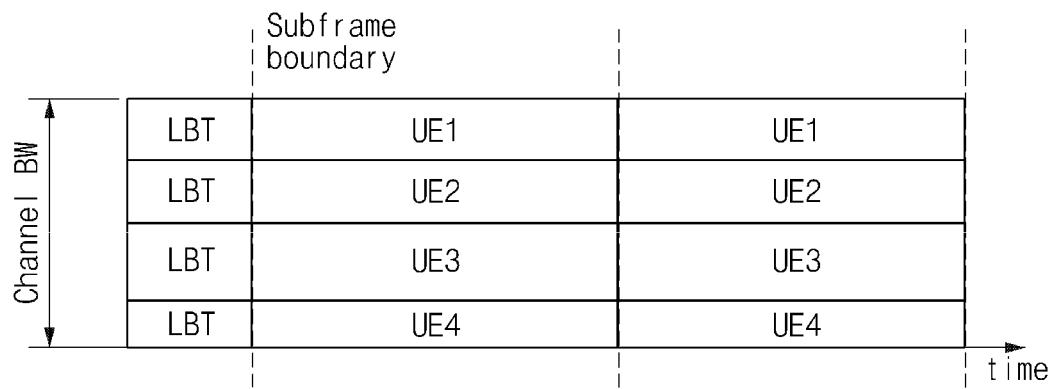
FIG. 3A as an exemplary diagram of uplink (UL) transmission in which the user terminals are scheduled to consecutive subframes in the frequency sharing by using wireless communication system 100 of the present invention illustrates an example in which LBT is configured in the rear parts of all uplink subframes.

FIG. 3A as an exemplary diagram of uplink (UL) transmission in which the user terminals are scheduled to consecutive subframes in the frequency sharing by using wireless communication system 100 of the present invention illustrates an example in which LBT is configured in the rear of a subframe. An upper drawing of FIG. 3A illustrates an example of using the same resource of multiple uplink subframes and a lower drawing of FIG. 3A illustrates an example of using resource use according to a specific pattern of the multiple uplink subframes. In FIG. 3A, the LBT is not segmented in the frequency domain but segmented as a concept in which each terminal performs transmission in the time domain. Further, the transmission resource of each terminal means not using only a part of the entire bandwidth but logically using a predetermined quantity of resources. Accordingly, the locations of resources actually physically allocated and used for transmission may be distributed to the entire band. A lower drawing of FIG. 3A illustrates an example of hopping RB resources by the unit of the subframe among embodiments to hop the RB resources scheduled to the terminal by the unit of the subframe or a slot.

FIG. 3B as an exemplary diagram of uplink (UL) transmission in which the user terminals are scheduled to consecutive subframes in the frequency sharing by using wireless communication system 100 of the present invention illustrates an example in which the LBT is configured in front of the subframe.

As illustrated in FIGS. 3A and 3B, a plurality of user terminals need to be scheduled onto N (natural number) consecutive subframes. When only information on the number of uplink (UL) subframes is known from the base station (NB), overhead for an uplink (UL) grant of the base station (NB) is reduced. As a result, a subframe based hopping scheme may also be considered for a frequency diversity gain.

As illustrated in FIGS. 3A and 3B, in respect to the uplink (UL) transmission burst, all UEs are allocated to a plurality of subframes consecutive from the first subframe to allow all UL transmission bursts to be continuously transmitted during an interval of the consecutive subframes.

Figure 3A:
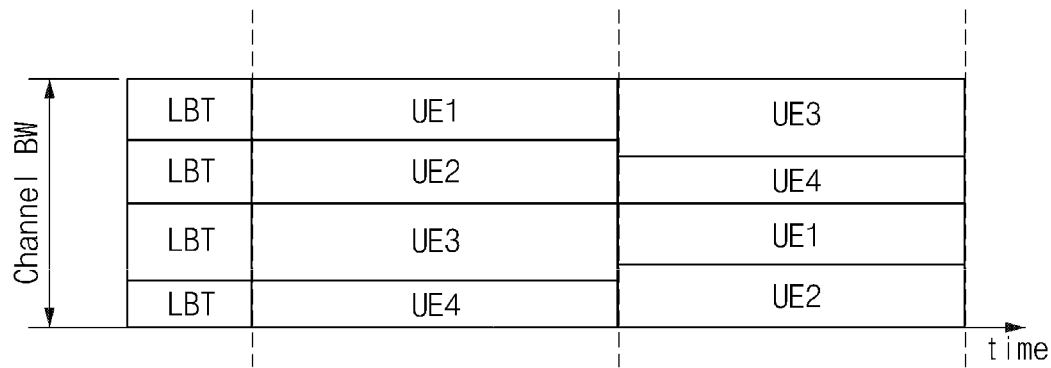

The base station (NB) adds the number of consecutive subframes to the downlink control information (DCI) such as PDCCH, or the like at the time of allocating the uplink (UL) to notify the number of consecutive subframes to the UEs so that the multiple subframe scheduling is realized. In order to solve a problem caused due to allocation of the resource to only the same resource block(s) (RBs), the RB resource may be hopped by the unit of the subframe or slot (see the lower drawing of FIG. 3).

Figure 4A:
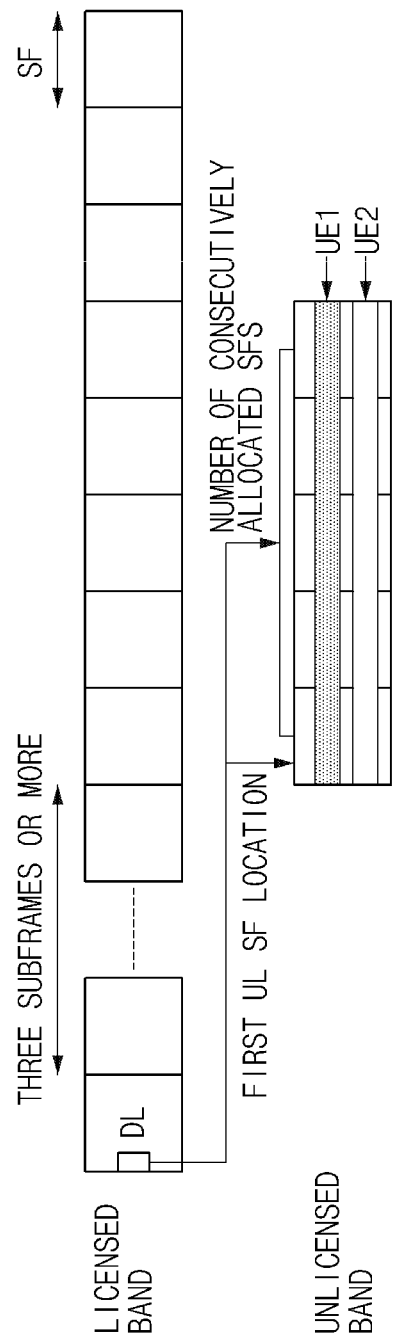
FIG. 4A is an exemplary diagram of a cross carrier scheduling scheme in which the user terminals are scheduled to multiple subframes in the frequency sharing by using wireless communication system 100 of the present invention.

FIG. 4A is an exemplary diagram of a cross carrier scheduling scheme in which the user terminals are scheduled to multiple subframes in the frequency sharing by using wireless communication system 100 of the present invention.

As illustrated in FIG. 4A, the base station (NB) may notify DCI including a start uplink (UL) subframe (SF) location which each UE may occupy in the unlicensed band (e.g., WiFi) or the number of multiple subframes consecutive or distant by a gap from the start uplink (UL) subframe (SF) location, through the downlink control information (DCI) of the physical downlink control channel (PDCCH), and the like by using the downlink (DL) subframe of the licensed band (e.g., LTE). In this case, by considering a transmission/reception delay, a first uplink (UL) subframe (SF) location of the consecutive subframes is designated after three or more subframes from the notified downlink (DL) subframe.

FIG. 4B is an exemplary diagram of a self-scheduling scheme in which the user terminals are scheduled to the multiple subframes in the frequency sharing by using wireless communication system 100 of the present invention.

As illustrated in FIG. 4B, the base station (NB) may notify DCI including a start uplink (UL) subframe (SF) location which each UE may be used in the unlicensed band (e.g., WiFi) or the number of multiple subframes consecutive or distant by a gap from the start uplink (UL) subframe (SF) location, through the DCI of the PDCCH, and the like by using the downlink (DL) subframe of the unlicensed band (e.g., WiFi). In this case, by considering the transmission and reception delay, the first uplink (UL) subframe (SF)

location of the consecutive subframes is designated after three or more subframes from the notified downlink (DL) subframe.

For reference, in a licensed band (e.g., LTE) frame structure, 10 subframes constitute one radio frame for 10 msec in terms of the time domain and one subframe is constituted by 2 slots. Each slot is constituted by multiple orthogonal frequency division multiplexing (OFDM) symbols and when a normal cyclic prefix (N_CP) is used, each slot is constituted by 7 OFDM symbols and when an extended cyclic prefix (CP) is used, each slot is constituted by 6 OFDM symbols. In the case of the N_CP, 14 symbols constitute one subframe. In terms of the frequency domain, 12 subcarriers constitute one resource block (RB) and as the number of RBs, a value defined in a standard by a system bandwidth is used.

Figure 4C:
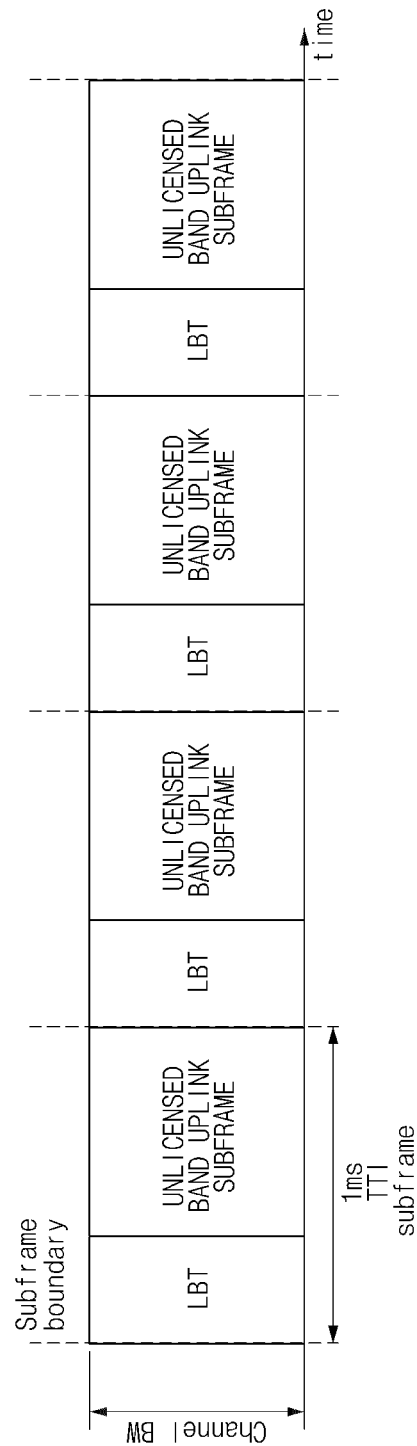
FIG. 4C illustrates an example in which an LBT interval is included in front parts of all uplink subframes in a scheduling scheme constituting multiple consecutive subframes in the frequency sharing by using wireless communication system 100 of the present invention.

FIG. 4C illustrates an example in which an LBT interval is included in front parts of all uplink subframes in a scheduling scheme constituting multiple consecutive subframes in the frequency sharing by using wireless communication system 100 of the present invention.

As illustrated in FIG. 4C, for example, the user terminals may be allocated to 4 consecutive uplink multiple subframes and the user terminals may be scheduled by the DCI of one downlink subframe of the licensed band or the unlicensed band.

Figure 4D:
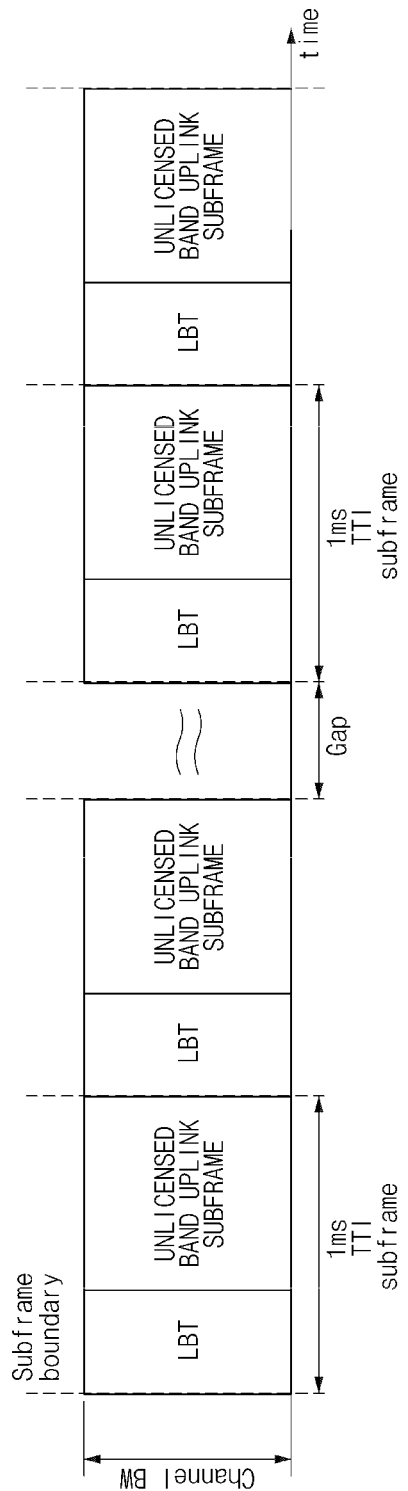
FIG. 4D illustrates an example in which the LBT interval is included in front parts of all uplink subframes in a scheduling scheme constituting multiple inconsecutive subframes in the frequency sharing by using wireless communication system 100 of the present invention.

FIG. 4D illustrates an example in which the LBT interval is included in front parts of all uplink subframes in a scheduling scheme constituting multiple inconsecutive subframes in the frequency sharing by using wireless communication system 100 of the present invention.

As illustrated in FIG. 4D, for example, the user terminals may be allocated to 4 uplink multiple subframes, but may be allocated to multiple subframes by a gap and even in the scheme, the user terminals may be scheduled by the DCI of one downlink subframe of the licensed band or the unlicensed band.

As described above, scheduling for a multi-subframe configuration in which one LBT is configured among all consecutive uplink subframes or the LBT is configured in each of all uplink subframes is enabled.

As illustrated in FIGS. 4A to 4D, scheduling information may be included in a DCI of a minimum of m−4-th downlink subframe from a first uplink (UL) subframe (SF) location (m) (natural number) which is usable. A subframe including the scheduling information may be the downlink subframe of the unlicensed band or the downlink subframe of the licensed band.

An embodiment of a DCI configuration for transferring the scheduling information in association with scheduling of the uplink multiple subframes may be described below. At least one DCI among the respective methods may be transmitted while being included in one downlink subframe.

[Method 1] Providing scheduling information (as a first uplink subframe location which may be occupied, an uplink subframe location (an X value of n+4+X) from an n (natural number)-th downlink including the DCI) for different uplink subframes with two or more different DCIs by using one downlink subframe in the base station (NB).

[Method 2] Providing scheduling information (the number of consecutive subframes including n+4+X subframes from the n-th downlink including the DCI) for two or more different uplink subframes with one DCI by using one downlink subframe in the base station (NB).

[Method 3] Providing scheduling information designated as a predetermined bit length included in the DCI in the base station (NB) with respect to one or more scheduling information defined by the higher layer message or RRC message.

In the [Method 1], information (e.g., scheduling information for different uplink subframes with two or more different DCIs by using one downlink subframe) on the subframe location may be additionally included in DCI formats for granting the existing uplink subframe. In the LTE, in general, an uplink scheduling associated DCI message included in the n-th subframe is valid in the n+4-th configured uplink subframe. In time division duplex (TDD) of the LTE, the uplink subframe is defined according to a downlink location including the DCI under a frame configuration condition of the uplink and the downlink. In the case of configuration 0 of the TDD, a UL index field may be included in the DCI of the downlink subframe. When the uplink is configured in two subframes of which locations are different in one downlink subframe, the UL index field is used for distinguishing the subframes. The uplink subframe location depending on the UL index value may be predefined. In an embodiment of an information configuration for [Method 1], the number of bits of the UL index is constituted by two or more of bits. A UL index of 2 bits or more is configured in each DCI to designate n+4+X subframes from the n-th downlink including the DCI. Herein, X as a positive integer including 0 may be defined according to the UL index value. When a maximum channel occupancy time of the unlicensed band is considered, the UL index may be configured by 3 bits (values of 0 to 7) as shown in [Table 4] as an embodiment.

TABLE 4

| UL Index (Value) | X value of n + 4 + X |
| --- | --- |
| 0 | 0 |
| 1 | 1 |
| 2 | 2 |
| 3 | 3 |
| 4 | 4 |
| 5 | 5 |
| 6 | 6 |
| 7 | 7 |

In another information configuring method for [Method 1], as flexible timing information for locations of n+4+X scheduled uplink subframes, the X value is directly defined (e.g., ~seconds). The X value may be defined while being included in the DCI for each uplink scheduling. In two embodiments for the [Method 1], multiple uplink subframes having a predetermined subframe length may be configured to be consecutive or to be spaced apart from each other by a gap without being consecutive.

In an embodiment of the DCI configuration for multiple consecutive uplink subframe scheduling associated with the [Method 2], the number (e.g., scheduling information on two or more different uplink subframes with one DCI) of consecutive subframes is designated. As described in the examples of FIGS. 4A and 4B, the number of subframes which are consecutive from a first start subframe is designated. The first start subframe may be designated as the n+4-th subframe based on the n-th downlink subframe including the DCI or a value newly defined in the DCI. The number of consecutively configured subframes may be newly defined in the DCI. As an embodiment, when 3 bits are used for the DCI, the number of consecutive multiple uplink subframes including the n+4-th subframe after the n-th subframe receiving the DCI may be defined as shown in [Table 5] according to a field value of 'Number of multiple subframes'.

TABLE 5

| Field value of the number of multiple subframes | Number of subframes including n + 4 |
| --- | --- |
| 0 | 1 |
| 1 | 2 |
| 2 | 3 |
| 3 | 4 |
| 4 | 5 |
| 5 | 6 |
| 6 | 7 |
| 7 | 8 |

The DCI formats for the [Method 1] and [Method 2] may be simultaneously configured in one downlink subframe. In this case, the field value of 'Number of multiple subframes' and the field value of 'UL index' may be simultaneously included in the DCI. As an embodiment, when the field value of 'Number of multiple subframes' becomes a predetermined value, the location of the uplink subframe may be designated by referring to the 'UL index' field of the DCI. As an embodiment, when it is assumed that the field value of 'Number of multiple subframes' is 0 which is a predetermined value, in this case, the field value may be appreciated as the uplink scheduling information for not the consecutive multiple subframes but the subframe location designated by the 'UL index' field. When the field value of 'Number of multiple subframes' is not 0, the field value may mean the number of multiple consecutive subframes including the n+4-th subframe. In this case, the UL index field may not be included in the DCI.

[Table 6] given below as a case in which the field 'Number of multiple subframes' having a length of 3 bits and the 'UL index' field having the length of 3 bits are both configured in the DCI is an embodiment considering the number of consecutive uplink subframes which is additionally configured in addition to the n+4-th subframe when the 'Number of multiple subframes' field value is 1 or more. When the 'Number of multiple subframes' field value is 0, the 'Number of multiple subframes' field value means the DCI for the uplink scheduling to be configured in not the multiple consecutive subframes but the subframe designated by the 'UL index' field value configured in the same DCI.

TABLE 6

| Field value of the number of multiple subframes | Meaning of field value |
| --- | --- |
| 0 | Designating multi-subframe location according to UL index field value |
| 1 | Additionally scheduling 1 subframe after n + 4 |
| 2 | Additionally scheduling 2 subframes after n + 4 |
| 3 | Additionally scheduling 3 subframes after n + 4 |
| 4 | Additionally scheduling 4 subframes after n + 4 |
| 5 | Additionally scheduling 5 subframes after n + 4 |
| 6 | Additionally scheduling 6 subframes after n + 4 |
| 7 | Additionally scheduling 7 subframes after n + 4 |

As yet another embodiment in which the 'Number of multiple subframes' field value and the 'UL index' field value are simultaneously included in the DCI, when the 'UL index' field value becomes a predetermined value, the 'Number of multiple subframes' field value may be referred.

As an embodiment, when the 'UL index' field value is 0 which is a predetermined value, only the subframe location defined as the 'UL index' is not scheduled to the uplink but the multiple subframes which are consecutive according to the 'Number of multiple subframes' field value configured in the same DCI may be scheduled to the uplink.

In [Table 7] given below, in the case where the 'UL index' field having the length of 3 bits and the 'Number of multiple subframes' field value having the length of 3 bits may be both configured in one DCI, when the 'UL index' value is 1 or more, the 'UL index' value may be defined as meaning an X value of n+3+X. Herein, the value of n+3+X means an n+3+X-th subframe location in which the uplink subframe for the DCI included in the n-th subframe is scheduled. In [Table 7] given below, when the 'UL index' value becomes 0, the uplink resource for the multiple subframes which are consecutive according to the 'Number of multiple subframes' field value included in the same DCI may be scheduled.

TABLE 7

| UL index field value | Meaning of field value |
| --- | --- |
| 0 | Designating multi-subframe location according to UL index field value |
| 1 | X value for n + 3 + X-th subframe location (n + 4-th subframe) |
| 2 | X value for n + 3 + X-th subframe location (n + 5-th subframe) |
| 3 | X value for n + 3 + X-th subframe location (n + 6-th subframe) |
| 4 | X value for n + 3 + X-th subframe location (n + 7-th subframe) |
| 5 | X value for n + 3 + X-th subframe location (n + 8-th subframe) |
| 6 | X value for n + 3 + X-th subframe location (n + 9-th subframe) |
| 7 | X value for n + 3 + X-th subframe location (n + 10-th subframe) |

[Method 3] relates to configuration information for one or more scheduling information such as the multi-subframe location, and the like by the RRC message or higher layer message and an actual configuration indication by a trigger field included in the DCI. As an embodiment, the uplink multi-subframe location information configured as described above may be included in the higher layer message or RRC message.

The location information (configuration information) may become a criterion for making the 'uplink multi-subframe trigger' field be included in the DCI in the downlink subframe of the base station (NB). For example, while each terminal operates in the unlicensed band, each terminal may receive one or more uplink multi-subframe location information from the base station (NB) through the RRC message or higher layer message. Each configuration information may be mapped to information having a predetermined bit length. A field ('uplink multi subframe trigger' field) to trigger the uplink multi subframe location information (configuration information) may be included in the DCI and the corresponding field value may be the same as the mapped information. Each terminal may configure the uplink multiple subframes according to the 'uplink multi subframe trigger' field value included in the DCI.

[UL Transmission]

FIG. 5 is a diagram for describing an example of a special subframe used in the frequency sharing by using wireless communication system 100 of the present invention.

As illustrated in FIG. 5, in DL+UL transmission for the multiplexing LTE-U (alternatively, LAA) service for the user terminals (UEs), the special subframe (SS) constituted by a downlink pilot time slot (DwPTS) for the downlink (DL) signal, an uplink pilot time slot (UpPTS) for the uplink (UL) signal, and a guard period (GP) considering an uplink/downlink wave transfer time may be used. That is, frame type 2 having the time division duplex (TDD) frame structure defined in the standard may be used. The special subframe (SS) is distinguished from the uplink (UL) subframe and the downlink (DL) subframe in the frame to occupy one subframe.

The DwPTS is used for transmitting a control signal (Cntl) such as the PDCCH, or the like and transmitting data such as a primary synchronization signal (PSS), a physical downlink shared channel (PDSCH), a reference signal, and the like. In a load based equipment (LBE) scheme of the LBT, a PRACH preamble of the UpPTS may be used for channel reservation for allowing the UEs to use the channel at the corresponding timing according to a predetermined timing advance value (TA). The GP may be used for the CCA (alternatively, extended CCA (ECCA)). In a frame based equipment (FBE) scheme of the LBT, the UpPTS may be used for transmitting a physical random access channel (PRACH) for UL synchronization, a sounding reference signal (SRS) for estimating a UL channel state, and the like.

[UpPTS+UL Transmission]

In order to reduce the hidden node problem in the LTE-U (alternatively, LAA) service, each user terminal (UE) may perform the channel sensing (alternatively, carrier sensing) in the LBE or FBE scheme of the LBT.

In the FBE scheme, the user terminal (UE) may perform the CCA and thereafter, transmit the uplink (UL) data.

In the LBE scheme, the user terminal (UE) may perform the CCA and thereafter, transmit the PRACH preamble or the channel reservation signal having a predetermined timing advance (TA) value for the channel reservation to the UpPTS. As a result, the user terminal (UE) needs to distinguish the unlicensed band (e.g., WiFi) signal of the WLAN system and the PRACH preamble for the uplink (UL) transmission.

[SS+UL Transmission]

The special subframe (SS) includes an (E)CCA interval in the GP, a PRACH preamble/SRS interval in the UpPTS, a control signal (Cntl)/PSS transmission interval in the DwPTS, and the like. In the case of the FBE, the user terminal (UE) may perform the CCA during the GP and transmit the PRACH preamble for the channel reservation and the SRS for estimating the channel state to the UpPTS as illustrated in FIG. 6.

Meanwhile, the DwPTS may include the (E)CCA interval, a reservation signal interval, a DL transmission interval, and the like. The reservation signal of the DwPTS may be used for the channel reservation and SS and UL indication (designating the UL in the special subframe).

When the base station (NB) gives the uplink (UL) grant to the user terminals (UEs) through the DL transmission (e.g., using the DwPTS interval) including the DCI, the base station (NB) may notify the common random back-off counter value to all user terminals (UEs) and after the DwPTS, all user terminals (UEs) may perform the ECCA. By such a scheme, a determination error for the channel occupation may be reduced. When the LBT is not required, each user terminal (UE) may transmit the PRACH preamble immediately after an Rx-Tx (reception-transmission) switch time for the DL transmission and the channel reservation.

In the case of the LBE, there may be a problem in transmitting the channel occupancy signal (e.g., TA) according to the (E)CCA for each UE. In this case, as illustrated in FIGS. 7A and 7B, the base station (NB) may randomly select and transfer the common random back-off counter value which all UEs will use in the UL grant information through the DL transmission and all UEs back off the random back-off counter value with the same value to avoid the collision by the interference.

Figure 7A:
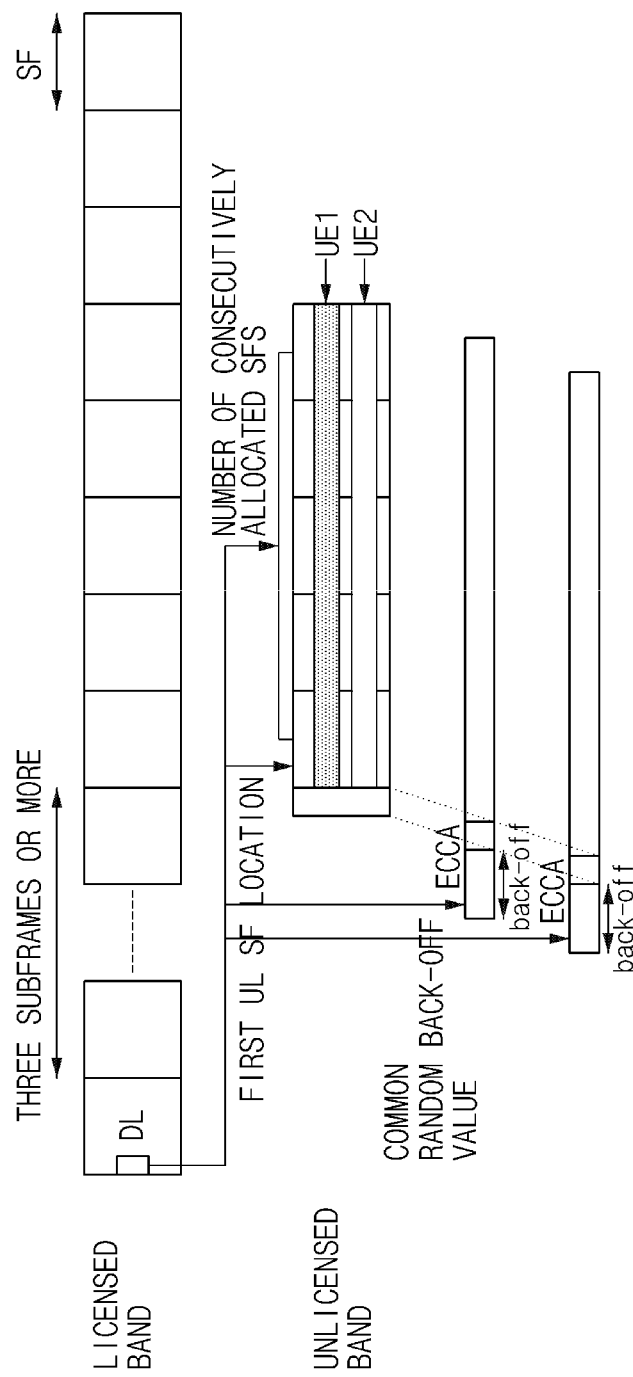
FIG. 7A is an exemplary diagram of a cross carrier scheduling scheme in which the common random back-off counter value is scheduled to the user terminals in the frequency sharing by using wireless communication system 100 of the present invention.

FIG. 7A is an exemplary diagram of a cross carrier scheduling scheme in which the common random back-off counter value is scheduled to the user terminals in the frequency sharing by using wireless communication system 100 of the present invention. FIG. 7B is an exemplary diagram of a self-scheduling scheme in which the common random back-off counter value is scheduled to the user terminals in the frequency sharing by using wireless communication system 100 of the present invention.

Figure 7B:
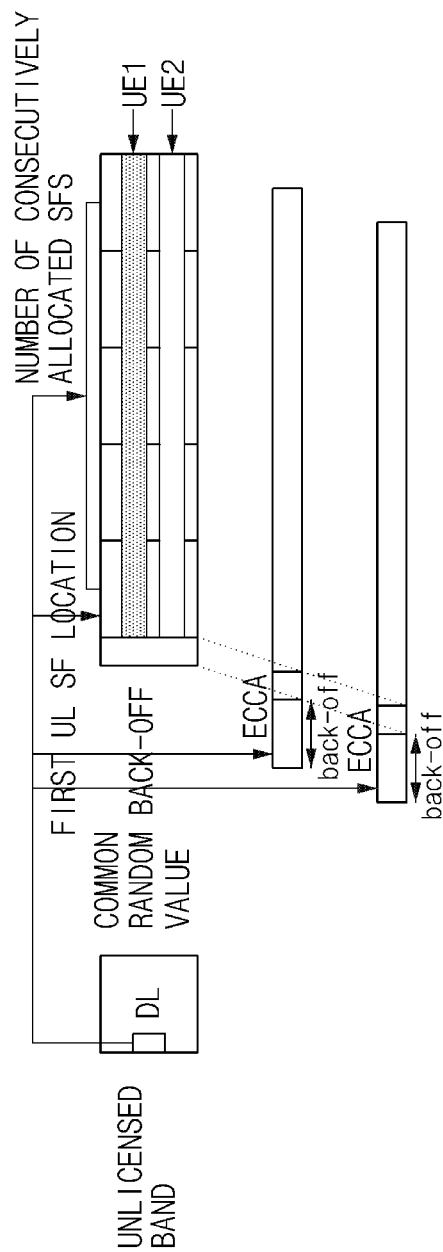
FIG. 7B is an exemplary diagram of a self-scheduling scheme in which the common random back-off counter value is scheduled to the user terminals in the frequency sharing by using wireless communication system 100 of the present invention.

As illustrated in FIGS. 7A and 7B, the respective user terminals (UEs) may receive the UL grant information at different locations and terminate a count-down and then perform the ECCA or LBT according to the designated common random back-off counter value. When each user terminal (UE) performs the ECCA to determine that the corresponding channel may be occupied, each user terminal (UE) may transmit the uplink (UL) data through a plurality of predetermined subframes (see UE1, UE2, UE3, and UE4 of FIG. 8) from a first uplink (UL) subframe (SF) location of a plurality of consecutive subframes notified through the DCI.

In FIGS. 7A and 7B, the random back-off based LBT performed by the terminal is described as the extended clear channel assessment (ECCA). The actual uplink resources used by the terminal may be diffused and configured to the entire bandwidth of the unlicensed band cell and in the drawings, the quantity of resources logically configured for each terminal is expressed. In the drawings, an example is expressed, in which information associated with the multiple uplink subframes is include in the DCI in addition to the random back-off value to configure the uplink.

In the above example, the random back-off counter value may be included in the DCI as a 'UL_Backoff' field. A bit value configuring the field may be determined according to the contention window size and as an embodiment, when the contention window size is a maximum of 7, the 'UL_Backoff' field may be constituted by 3 bits. In an embodiment in which the 'UL_Backoff' field is defined by 3 bits, a value of 0 of the field may be used by performing the LBT having a fixed channel sensing length without the random back-off. That is, as an embodiment, when the 'UL_Backoff' field value is 0, the terminal may perform not the random back-off before the scheduled uplink transmission but channel sensing having one fixed length of 9 μs, 16 μs, 25 μs, and 34 μs. The 'UL_Backoff' field may be included in the DCI of the (E)PDCCH in which the CRC is masked with the C-RNTI allocated to each terminal. As another embodiment, the 'UL_Backoff' field may be included in the DCI of the PDCCH which is transmitted to the cell common search area in which the CRC is masked with the U-RNTI or CC-RNTI of the unlicensed band cell.

[DL+SS+UL Transmission]

Figure 9:
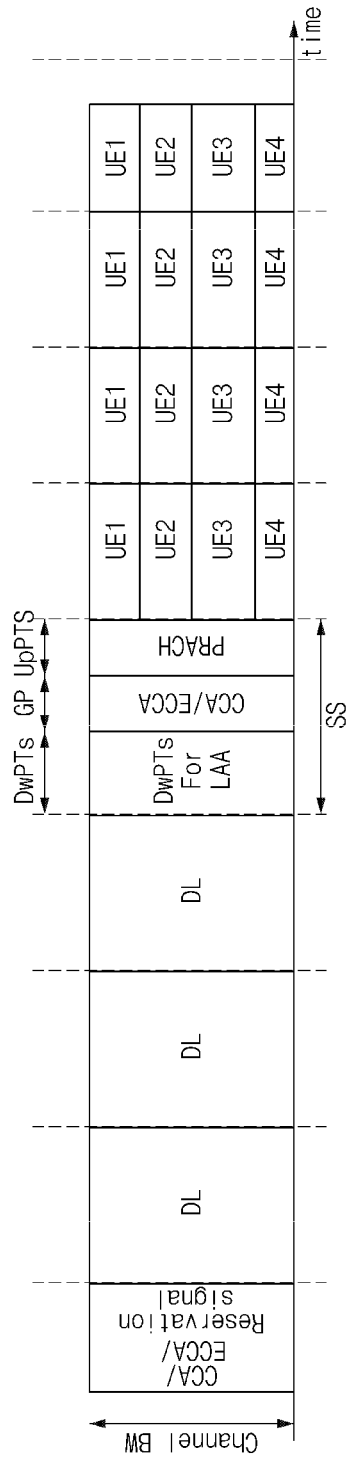
FIG. 9 is a diagram for describing a case in which self-scheduling is advantageous in the frequency sharing by using wireless communication system 100 of the present invention.

FIG. 9 is a diagram for describing a case in which self-scheduling is advantageous in the frequency sharing by using wireless communication system 100 of the present invention.

As illustrated in FIG. 9, when three or more downlink (DL) subframes are scheduled to the unlicensed band (e.g., WiFi), since three or more subframe intervals including the special subframe (SS) are given and thereafter, the user terminal (UE) may perform the uplink (UL) transmission, therefore, the self-scheduling is enabled. In this case, for the unlicensed band (e.g., WiFi) access, using the self-scheduling is more preferable than using the cross-carrier scheduling.

As described above, in the LTE-U (alternatively, LAA) service of the frequency sharing by using wireless communication system 100, when the user terminal (UE) performs the channel sensing (alternatively, carrier sensing), the hidden node problem may be reduced by performing the clear channel assessment (CCA), but an effect of the CCA performed by the user terminal (UE) needs to be considered.

[Consideration 1]

Figure 10A:
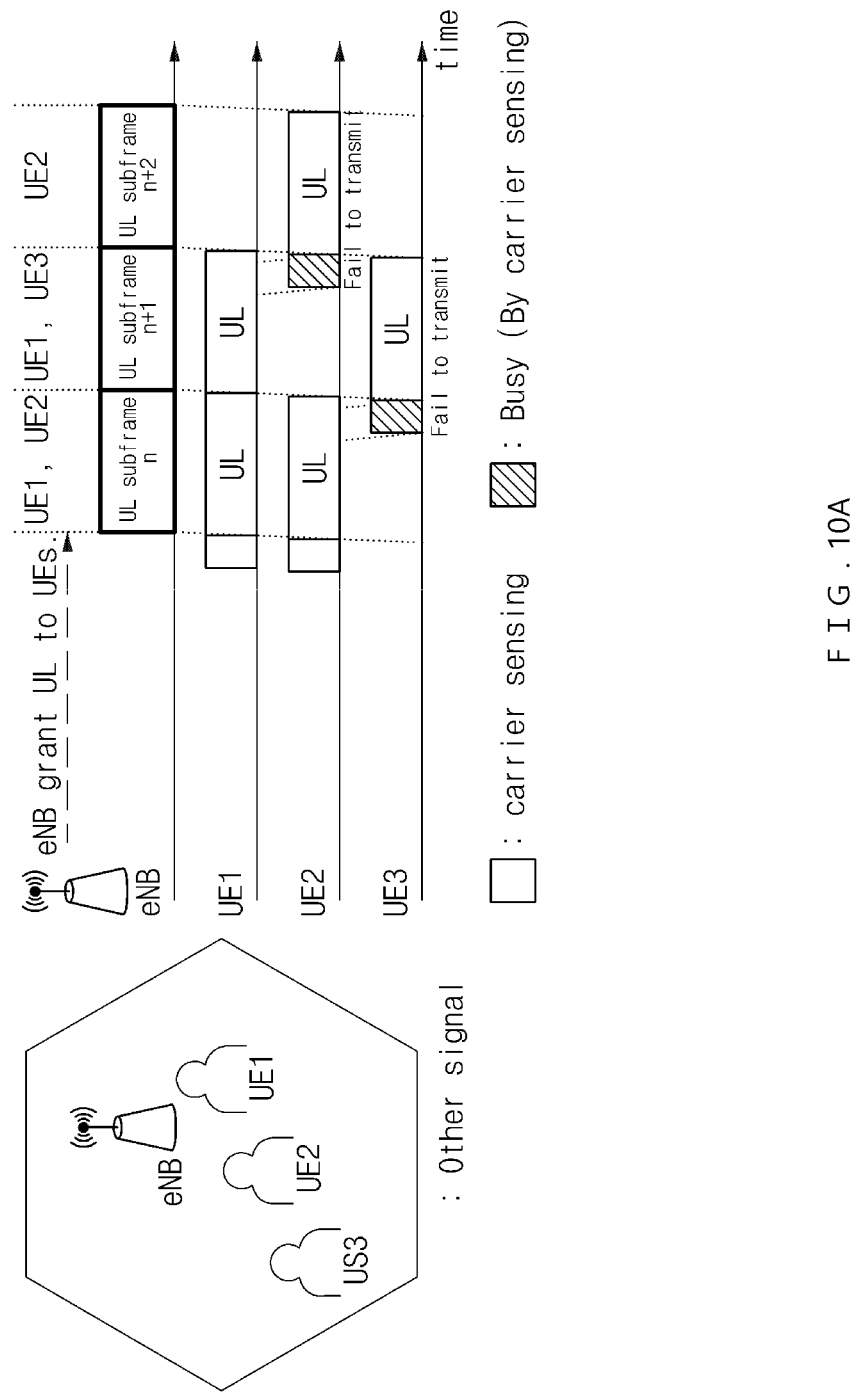
FIG. 10A is a diagram for describing an example of a success and a failure of UL transmission depending on a CCA result in the user terminals (UE) of the frequency sharing by using wireless communication system 100 of the present invention.

FIG. 10A is a diagram for describing an example of a success and a failure of UL transmission depending on a CCA result in the user terminals (UE) of the frequency sharing by using wireless communication system 100 of the present invention.

Referring to FIG. 10A, the base station (NB) may grant resource blocks of different UL subframes to the user terminals UE1, UE2, and UE3 in an LAA UL transmission burst constituted by the plurality of consecutive subframes of the unlicensed band (e.g., WiFi).

Under a condition in which all user terminals UE1, UE2, and UE3 perform the channel sensing (alternatively, carrier sensing) before the UL transmission, whenever UL transmission of another user terminal is received in a previous UL subframe during the CCA, any user terminal may be determined to be in the occupancy state of the corresponding channel. As a result of the CCA, the user terminals (UE2 and UE3 of FIG. 10A) do not perform the UL transmission (fail) when the corresponding channel is in an inaccessible state.

That is, the terminals UE1 and UE2 perform transmission while being scheduled to the n-th subframe, and as a result, the terminal UE3 may determine that the channel is occupied according to a channel sensing result before transmitting the n+1-th subframe. In this case, the terminal UE3 may not transmit the n+1-th subframe. Moreover, the UE2 scheduled to the n+2-th subframe may not also perform n+2-th transmission according to the channel sensing result.

Figure 10B:
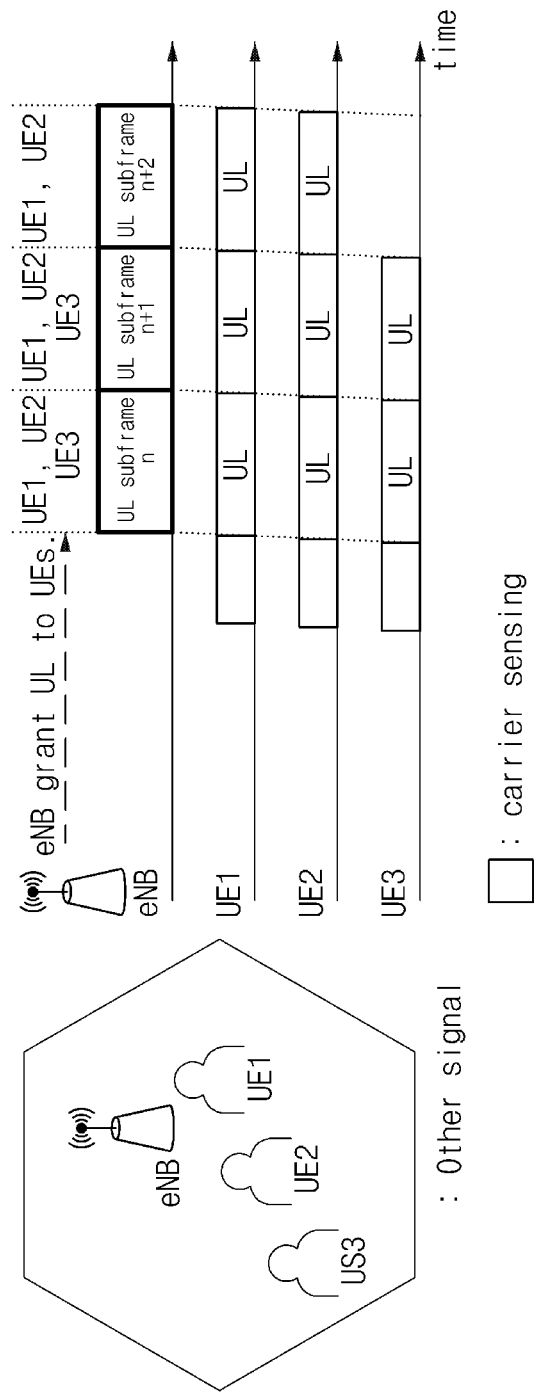
FIG. 10B is a diagram for describing a solution example which enables all user terminals (UE) to succeed in the UL transmission in the frequency sharing by using wireless communication system 100 of the present invention.

FIG. 10B is a diagram for describing a solution example which enables all user terminals (UE) of the frequency sharing by using wireless communication system 100 of the present invention to succeed in the UL transmission.

Referring to FIG. 10B, as a solution for a situation illustrated in FIG. 10A, the base station (NB) may grant (multi-subframe scheduling scheme) to all user terminals UE1, UE2, and UE3 the uplink resource constituted by the plurality of subframes which are consecutive from a first uplink (UL) subframe (SF) location of the LAA UL transmission burst as described even in FIGS. 3 to 9.

That is, since the LBT for the channel sensing is performed by all terminals at the same time and the resources of the frequency domain are shared by the terminals, a transmission impossible problem may be solved. A terminal having resources to be transmitted, which are not a lot may schedule and transmit the resources to only first some of all consecutive uplink subframes.

Since uplink (UL) multiplexing of multiple user terminals is supported in the frequency domain of one subframe, the base station (NB) may allow all user terminals to be scheduled to the LAA UL transmission burst in the same subframe. In this case, a total amount of required resource blocks is spread to the plurality of consecutive subframes, and as a result, the number of resource blocks per user terminal may decrease in one subframe.

In such a scheme, even under a condition of the same transmission power in the subframe, higher PSD per subcarrier is used by considering a maximum power spectrum density (PSD) of a regulatory requirement, and as a result, uplink (UL) coverage may be extended. Besides, the multi-subframe scheduling scheme reduces overhead of DCI notification for the UL grant on the plurality of downlink (DL) subframes. The reason is that the DCI is just notified to the user terminals (UEs) through the corresponding resource block(s) by the unit of the plurality of consecutive UL subframes. The solution may better operate in the case of the CCA of the FBE. The reason is that as illustrated in FIG. 10B, all scheduled user terminals (UEs) accurately perform the CCA for a channel access mechanism of the FBE on a UL subframe boundary.

[Consideration 2]

More considerations are required due to the random back-off in the channel access mechanism of the ECCA in the LBE.

Figure 11A:
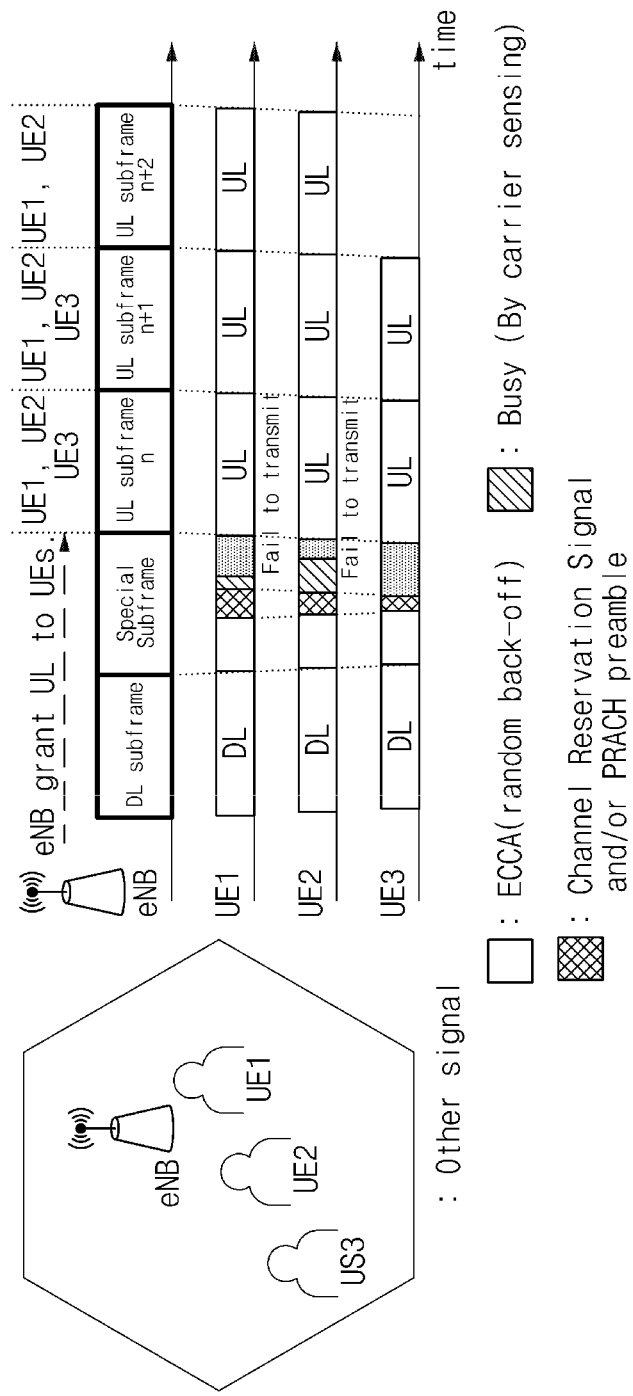
FIG. 11A is a diagram for describing an example of a case in which an LAA UL transmission burst is deployed in the rear of a special subframe (SS) in the frequency sharing by using wireless communication system 100 of the present invention.

FIG. 11A is a diagram for describing an example of a case in which an LAA UL transmission burst is deployed in the rear of a special subframe (SS) in the frequency sharing by using wireless communication system 100 of the present invention.

Referring to FIG. 11A, the user terminals UE1, UE2, and UE3 scheduled to uplink (UL) subframe n verify a corresponding operating channel by performing the ECCA in order to check whether the corresponding operating channel is occupied or idle in subframe n−1. When another uplink (UL) transmission is terminated and the channel is idle in subframe n−1, the user terminals UE1, UE2, and UE3 may transmit the uplink (UL) signal to subframe n by performing the ECCA.

However, when the time of performing the ECCA among the user terminals UE1, UE2, and UE3 and a designated random back-off counter value are different from each other, UL transmission of any user terminal (e.g., UE1 or UE2) may be interrupted (fail). As the downlink (DL) signal by the DwPTS of the special subframe (SS) is received, the user terminals UE1, UE2, and UE3 thereafter perform the ECCA with the random back-off counter value.

For example, in FIG. 11A, the UE3 having a shortest back-off counter value is latest in terms of an ECCA start time, but after the count-down of the back-off counter is terminated, the UE3 may transmit the PRACH preamble or channel reservation signal through the UpPTS earlier than the UE1 and UE2. With UL transmission through the UpPTS of the UE3, the UE1 and the UE2 determine that the corresponding channel is occupied by detecting the UL transmission of the UE3 while performing the ECCA not to perform the UL transmission.

In other words, when the respective user terminals select different random back-off counter values, it may be determined that the channel is occupied according to the uplink signal of another terminal scheduled to the same subframe as illustrated in FIG. 11A. In this case, a specific terminal may abandon transmission. That is, FIG. 11A illustrates an embodiment in which a specific user terminal abandons transmission depending on the user terminals that select different random back-off values.

Figure 11B:
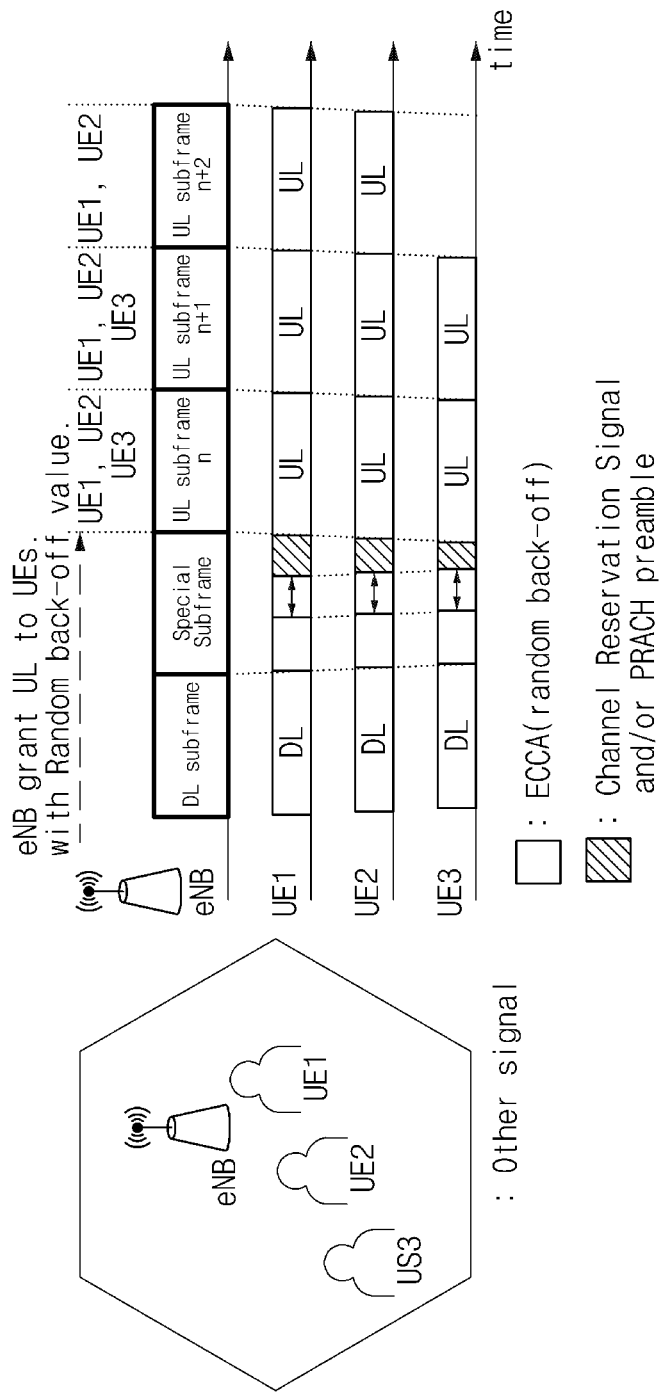
FIG. 11B is a diagram for describing a solution example which enables all user terminals (UE) to succeed in the UL transmission when the LAA UL transmission burst is deployed in the rear of the special subframe (SS) in the frequency sharing by using wireless communication system 100 of the present invention.

FIG. 11B is a diagram for describing a solution example which enables all user terminals (UE) to succeed in the UL transmission when the LAA UL transmission burst is deployed after the special subframe (SS) in the frequency sharing by using wireless communication system 100 of the present invention.

Referring to FIG. 11B, the user terminals UE1, UE2, and UE3 are scheduled to use the common random back-off counter value randomly selected by the base station (NB) (see FIGS. 7A and 7B) to solve the problem illustrated in FIG. 11A.

For example, in FIG. 11B, the ECCA start times of the user terminals UE1, UE2, and UE3 are different from each other, but count-down termination times of the back-off counters are sequentially different from each other, and as a result, the respective user terminals UE1, UE2, and UE3 may transmit the PRACH preamble or channel reservation signal and thereafter, succeed in UL data transmission.

That is, the random back-off value is selected by not the user terminal but the base station to be included in the DCI for the uplink scheduling transmitted in the licensed band or unlicensed band. FIG. 11B illustrates an embodiment in which the base station transfers the common random back-off value to all terminals to match transmission times. The respective terminal may perform the common random back-off based on a transmission time defined after the downlink. Each terminal may transmit the channel occupancy signal or the PRACH or SRS signal before transmitting actual data.

Information on the common random back-off counter value may be notified to the UL grant of the base station (NB). When performances of the FBE and the LBE are compared with each other, the LBE using the PRACH preamble or channel reservation signal for the channel reservation may have the better performance.

As described above, in the frequency sharing by using wireless communication system 100 according to the present invention, in the LTE-U service, the user terminal considers the hidden node problem by performing the clear channel assessment (CCA) and considers the channel occupation based on the uplink signal of another terminal, and the like and the channel access procedure required for the uplink transmission of the unlicensed band and the multi-subframe scheduling scheme are applied to transmit the uplink data of the unlicensed band, thereby improving the uplink transmission efficiency.

The above description just illustrates the technical spirit of the present invention and various modifications and transformations can be made to those skilled in the art without departing from an essential characteristic of the present invention.

Therefore, the embodiments disclosed in the present invention are used to not limit but describe the technical spirit of the present invention and the scope of the technical spirit of the present invention is not limited by the embodiments. The scope of the present invention should be interpreted by the appended claims and it should be analyzed that all technical spirits in the equivalent range are intended to be embraced by the scope of the present invention.

The invention claimed is:

1. An uplink data transmission method of a user terminal for using an unlicensed band cell as a secondary cell in a wireless communication system using a licensed band, the method comprising:
   receiving, from a base station, downlink control information (DCI) for multiple uplink subframes occupiable by the user terminal by using a downlink subframe;
   identifying scheduling information and a common random back-off counter value included in the DCI;
   performing a count-down based on the common random back-off counter value;
   performing, for transmitting uplink data in an uplink subframe indicated by the scheduling information, clear channel assessment (CCA) according to a listen before talking (LBT) scheme after performing the count-down; and
   transmitting the uplink data at a specific time after performing the CCA,
   wherein the common random back-off counter value is a commonly-scheduled random back-off counter value to all user terminals which use the unlicensed band cell,
   wherein the specific time is the same for all user terminals which have received the common random back-off counter value, and
   wherein the DCI includes information on a number of multiple consecutive uplink subframes including an n+4-th subframe after an n-th downlink subframe including a corresponding DCI, and an index of an X value which is a natural number equal to or greater than 1 for designating a location n+3+X of the uplink subframe.

2. The uplink data transmission method of claim 1, wherein the multiple uplink subframes indicated by the DCI start in a subframe distant from the downlink subframe by three or more subframes.

3. The uplink data transmission method of claim 1, wherein the DCI includes a location of a start subframe which is occupiable or information on a number of multiple subframes which are consecutive or distant by a gap from the start subframe location.

4. The uplink data transmission method of claim 1, wherein the DCI includes scheduling information for different uplink subframes through two or more different DCIs by using one downlink subframe.

5. The uplink data transmission method of claim 1, wherein the DCI includes scheduling information for two or more different uplink subframes with one DCI by using one downlink subframe.

6. The uplink data transmission method of claim 1, wherein the DCI includes a trigger field value designated while being mapped to a predetermined bit length included in the DCI with respect to one or more pieces of scheduling information for configuring the multiple uplink subframes defined by a higher layer message or a radio resource control (RRC) message received by the user terminal.

7. The uplink data transmission method of claim 1, wherein in the performing the CCA, a frame-based equipment (FBE) scheme in which each user terminal performs the CCA and thereafter, transmits the uplink data, is included.

8. The uplink data transmission method of claim 1, wherein in the performing the CCA, a load-based equipment (LBE) scheme in which each user terminal performs the CCA and thereafter, occupies a channel by transmitting a physical random access channel (PRACH) preamble and a channel reservation signal by using an uplink pilot time slot (UpPTS) interval of a special subframe (SS), is included.

9. The uplink data transmission method of claim 1,
   wherein the receiving of the DCI further comprises receiving an uplink grant with a common random back-off counter value; and
   the performing the CCA further comprises performing a count-down based on the random back-off counter value.

10. A downlink data transmission method of a base station using an unlicensed band cell as a secondary cell in a wireless communication system using a licensed band, the method comprising:

generating downlink control information (DCI) for multiple uplink subframes occupiable by a user terminal;

transmitting the DCI, which includes an uplink grant with a common random back-off counter value, by using a downlink subframe; and receiving uplink data at a specific time by using the multiple uplink subframes, based on a result of a count-down by one of user terminals based on the common random back-off counter value and a result of a clear channel assessment (CCA) by one of the user terminals according to a listen before talking (LBT) scheme, wherein the common random back-off counter value is a commonly-scheduled random back-off counter value to all user terminals which use the unlicensed band cell, wherein the specific time is the same for all user terminals which have received the common random back-off counter value, and wherein the DCI includes information on a number of multiple consecutive uplink subframes including an n+4-th subframe after an n-th downlink subframe including a corresponding DCI, and an index of an X value which is a natural number equal to or greater than 1 for designating a location n+3+X of an uplink subframe.

11. The downlink data transmission method of claim 10, wherein, in the transmitting of the DCI, the base station further transmits an uplink grant with a common random back-off counter value.

12. The downlink data transmission method of claim 11, wherein the uplink grant is transmitted by using a downlink pilot time slot (DwPTS) interval of a special subframe (SS).

13. The downlink data transmission method of claim 11, wherein the uplink grant is transmitted by a self-scheduling scheme or a cross carrier scheduling scheme.

* * * * *